(12) United States Patent
Mahgerefteh et al.

(10) Patent No.: US 8,204,386 B2
(45) Date of Patent: Jun. 19, 2012

(54) CHIRPED LASER WITH PASSIVE FILTER ELEMENT FOR DIFFERENTIAL PHASE SHIFT KEYING GENERATION

(75) Inventors: Daniel Mahgerefteh, Palo Alto, CA (US); Kevin J. McCallion, Charlestown, MA (US); The'Linh Nguyen, San Jose, CA (US); David Allouche, Belmont, CA (US)

(73) Assignee: Finisar Corporation, Sunnyvale, CA (US)

( * ) Notice: Subject to any disclaimer, the term of this patent is extended or adjusted under 35 U.S.C. 154(b) by 1016 days.

(21) Appl. No.: 12/126,717

(22) Filed: May 23, 2008

(65) Prior Publication Data

US 2009/0003842 A1    Jan. 1, 2009

Related U.S. Application Data

(63) Continuation-in-part of application No. 12/014,676, filed on Jan. 15, 2008, and a continuation-in-part of application No. 11/784,395, filed on Apr. 6, 2007, now Pat. No. 7,474,859.

(60) Provisional application No. 60/931,359, filed on May 23, 2007.

(51) Int. Cl.
H04B 10/04 (2006.01)
H01S 3/10 (2006.01)

(52) U.S. Cl. ............... 398/186; 398/183; 398/201

(58) Field of Classification Search ........... 398/182–198
See application file for complete search history.

(56) References Cited

U.S. PATENT DOCUMENTS

| | | |
|---|---|---|
| 3,324,295 A | 6/1967 | Harris |
| 3,973,216 A | 8/1976 | Hughes et al. |
| 3,999,105 A | 12/1976 | Archey et al. |
| 4,038,600 A | 7/1977 | Thomas et al. |
| 4,561,119 A | 12/1985 | Epworth |
| 4,671,604 A | 6/1987 | Soref |
| 4,754,459 A | 6/1988 | Westbrook |
| 4,805,235 A | 2/1989 | Henmi |

(Continued)

FOREIGN PATENT DOCUMENTS

CA    2510352    3/2010

(Continued)

OTHER PUBLICATIONS

Title: CMOS Multi-level Signal Transmitter for Optical Communication Author: Sungyong Jung and Jean Gao Publisher: The 47th IEEE International Midwest Symposium on Circuits and Systems Date: 2004.*

(Continued)

*Primary Examiner* — Nathan Curs
*Assistant Examiner* — Tanya Ngo
(74) *Attorney, Agent, or Firm* — Maschoff Gilmore & Israelson

(57) ABSTRACT

Apparatus and methods for driving a transmitter to generate DNPSK signals is disclosed including generating N data streams comprising data symbols and for each of a plurality of sets of N simultaneous data symbols of the N data streams, imposing signals are on L of a plurality of signal lines, with the value of L corresponding to values of the N simultaneous data symbols. Signals on the plurality of signal lines are ANDed with a clock signal synchronized with the N data streams to produce RZ signals. The RZ signals are summed and the summed signal is input to a laser that produces an output having frequency modulation corresponding to the magnitude of the summed signal. The output of the laser is passed through an optical discriminator.

22 Claims, 13 Drawing Sheets

U.S. PATENT DOCUMENTS

| | | | |
|---|---|---|---|
| 4,841,519 A * | 6/1989 | Nishio | 398/91 |
| 4,896,325 A | 1/1990 | Coldren | |
| 4,908,833 A * | 3/1990 | Chraplyvy et al. | 372/96 |
| 4,914,667 A | 4/1990 | Blonder et al. | |
| 4,918,331 A * | 4/1990 | Van Zanten et al. | 327/141 |
| 5,088,097 A | 2/1992 | Ono et al. | |
| 5,119,393 A | 6/1992 | Oka et al. | |
| 5,136,598 A | 8/1992 | Weller et al. | |
| 5,170,402 A | 12/1992 | Ogita et al. | |
| 5,177,630 A | 1/1993 | Goutzoulis et al. | |
| 5,293,545 A | 3/1994 | Huber | |
| 5,305,134 A * | 4/1994 | Tsushima et al. | 398/91 |
| 5,325,378 A | 6/1994 | Zorabedian | |
| 5,325,382 A | 6/1994 | Emura et al. | |
| 5,371,625 A | 12/1994 | Wedding et al. | |
| 5,394,429 A | 2/1995 | Yamada et al. | |
| 5,412,474 A | 5/1995 | Reasenberg et al. | |
| 5,416,629 A | 5/1995 | Huber | |
| 5,434,693 A | 7/1995 | Tanaka et al. | |
| 5,450,432 A | 9/1995 | Okuda | |
| 5,459,799 A | 10/1995 | Weber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,568,311 A | 10/1996 | Matsumoto | |
| 5,592,327 A | 1/1997 | Gabl et al. | |
| 5,642,371 A | 6/1997 | Tohyama et al. | |
| 5,696,859 A | 12/1997 | Onaka et al. | |
| 5,737,104 A | 4/1998 | Lee et al. | |
| 5,777,773 A | 7/1998 | Epworth et al. | |
| 5,805,235 A | 9/1998 | Bedard | |
| 5,856,980 A | 1/1999 | Doyle et al. | |
| 5,920,416 A | 7/1999 | Beylat et al. | |
| 5,946,129 A | 8/1999 | Xu et al. | |
| 5,953,139 A | 9/1999 | Nemecek et al. | |
| 5,953,361 A | 9/1999 | Borchert | |
| 5,974,209 A | 10/1999 | Cho et al. | |
| 5,991,323 A | 11/1999 | Adams et al. | |
| 6,018,275 A | 1/2000 | Perrett et al. | |
| 6,081,361 A | 6/2000 | Adams et al. | |
| 6,088,373 A | 7/2000 | Hakki | |
| 6,091,743 A | 7/2000 | Yang | |
| 6,096,496 A | 8/2000 | Frankel | |
| 6,104,851 A | 8/2000 | Mahgerefteh | |
| 6,115,403 A | 9/2000 | Brenner et al. | |
| 6,148,017 A | 11/2000 | Borchert et al. | |
| 6,157,025 A | 12/2000 | Katagiri et al. | |
| 6,177,891 B1 * | 1/2001 | Nakamura | 341/100 |
| 6,188,499 B1 | 2/2001 | Majima | |
| 6,222,861 B1 | 4/2001 | Kuo et al. | |
| 6,271,959 B1 | 8/2001 | Kim et al. | |
| 6,282,003 B1 | 8/2001 | Logan et al. | |
| 6,298,186 B1 | 10/2001 | He | |
| 6,331,991 B1 | 12/2001 | Mahgerefteh | |
| 6,351,585 B1 | 2/2002 | Amundson et al. | |
| 6,353,623 B1 | 3/2002 | Munks | |
| 6,359,716 B1 | 3/2002 | Taylor | |
| 6,421,151 B1 * | 7/2002 | Berger et al. | 398/79 |
| 6,459,518 B1 | 10/2002 | Suzuki et al. | |
| 6,473,214 B1 | 10/2002 | Roberts et al. | |
| 6,486,440 B1 | 11/2002 | Crafts et al. | |
| 6,506,342 B1 | 1/2003 | Frankel | |
| 6,522,809 B1 | 2/2003 | Takabayashi et al. | |
| 6,563,623 B1 | 5/2003 | Penninckx et al. | |
| 6,577,013 B1 | 6/2003 | Glenn et al. | |
| 6,580,739 B1 | 6/2003 | Coldren | |
| 6,618,513 B2 | 9/2003 | Evankow, Jr. | |
| 6,628,690 B1 | 9/2003 | Fish et al. | |
| 6,650,667 B2 | 11/2003 | Nasu et al. | |
| 6,654,564 B1 | 11/2003 | Colbourne et al. | |
| 6,658,031 B2 | 12/2003 | Tuganov et al. | |
| 6,665,351 B2 | 12/2003 | Hedberg | |
| 6,687,278 B1 | 2/2004 | Mason et al. | |
| 6,690,686 B2 | 2/2004 | Delfyett | |
| 6,738,398 B2 | 5/2004 | Hirata | |
| 6,748,133 B2 | 6/2004 | Liu et al. | |
| 6,778,307 B2 | 8/2004 | Clark | |
| 6,785,308 B2 | 8/2004 | Dyer et al. | |
| 6,807,215 B2 | 10/2004 | Lam et al. | |
| 6,810,047 B2 | 10/2004 | Oh et al. | |
| 6,815,786 B2 | 11/2004 | Ogasawara et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,943,951 B2 | 9/2005 | Kikuchi et al. | |
| 6,947,206 B2 | 9/2005 | Tsadka et al. | |
| 6,963,685 B2 | 11/2005 | Mahgerefteh et al. | |
| 7,013,090 B2 | 3/2006 | Adachi et al. | |
| 7,027,470 B2 | 4/2006 | May | |
| 7,054,538 B2 | 5/2006 | Mahgerefteh et al. | |
| 7,073,956 B1 | 7/2006 | Shin et al. | |
| 7,076,170 B2 | 7/2006 | Choa | |
| 7,123,846 B2 * | 10/2006 | Tateyama et al. | 398/209 |
| 7,164,865 B2 | 1/2007 | Tatsuno et al. | |
| 7,187,821 B2 | 3/2007 | Matsui et al. | |
| 7,263,291 B2 | 8/2007 | Mahgerefteh et al. | |
| 7,280,721 B2 | 10/2007 | McCallion et al. | |
| 7,352,968 B2 | 4/2008 | Tayebati | |
| 7,356,264 B2 | 4/2008 | Mahgerefteh et al. | |
| 7,376,352 B2 | 5/2008 | Tayebati | |
| 7,406,266 B2 | 7/2008 | Mahgerefteh et al. | |
| 7,406,267 B2 | 7/2008 | Mahgerefteh et al. | |
| 7,433,605 B2 | 10/2008 | Mahgerefteh et al. | |
| 7,474,858 B2 * | 1/2009 | Lee et al. | 398/183 |
| 7,474,859 B2 | 1/2009 | Mahgerefteh et al. | |
| 7,477,851 B2 | 1/2009 | Mahgerefteh et al. | |
| 7,480,464 B2 | 1/2009 | McCallion et al. | |
| 7,492,976 B2 | 2/2009 | Mahgerefteh et al. | |
| 7,502,532 B2 | 3/2009 | McCallion et al. | |
| 7,505,694 B2 | 3/2009 | Johnson et al. | |
| 7,515,626 B2 | 4/2009 | Lee et al. | |
| 7,536,113 B2 | 5/2009 | Matsui et al. | |
| 7,542,683 B2 | 6/2009 | Matsui et al. | |
| 7,555,225 B2 | 6/2009 | Mahgerefteh et al. | |
| 7,558,488 B2 | 7/2009 | Matsui et al. | |
| 7,564,889 B2 | 7/2009 | Matsui et al. | |
| 7,609,977 B2 | 10/2009 | Matsui et al. | |
| 7,613,401 B2 | 11/2009 | Matsui et al. | |
| 7,616,902 B2 | 11/2009 | Mahgerefteh et al. | |
| 7,630,425 B2 | 12/2009 | Tayebati et al. | |
| 7,639,955 B2 | 12/2009 | Zheng et al. | |
| 7,657,179 B2 | 2/2010 | Mahgerefteh et al. | |
| 7,663,762 B2 | 2/2010 | Mahgerefteh et al. | |
| 7,697,186 B2 | 4/2010 | McCallion et al. | |
| 7,697,847 B2 | 4/2010 | Matsui et al. | |
| 7,742,542 B2 | 6/2010 | Mahgerefteh et al. | |
| 7,760,777 B2 | 7/2010 | Matsui et al. | |
| 7,778,295 B2 | 8/2010 | Matsui et al. | |
| 7,809,280 B2 | 10/2010 | Mahgerefteh et al. | |
| 7,860,404 B2 | 12/2010 | Matsui et al. | |
| 7,869,473 B2 | 1/2011 | Ye et al. | |
| 7,941,057 B2 | 5/2011 | Mahgerefteh et al. | |
| 7,962,044 B2 | 6/2011 | McCallion et al. | |
| 7,962,045 B2 | 6/2011 | McCallion et al. | |
| 7,991,291 B2 | 8/2011 | Matsui et al. | |
| 8,068,742 B2 | 11/2011 | Cole et al. | |
| 2001/0012430 A1 | 8/2001 | Usami et al. | |
| 2001/0048705 A1 | 12/2001 | Kitaoka et al. | |
| 2002/0012369 A1 | 1/2002 | Nasu et al. | |
| 2002/0026981 A1 * | 3/2002 | Fukushima | 156/264 |
| 2002/0044738 A1 | 4/2002 | Jablonski | |
| 2002/0048290 A1 | 4/2002 | Tanaka et al. | |
| 2002/0063930 A1 | 5/2002 | Blauvelt | |
| 2002/0109893 A1 * | 8/2002 | Givehchi | 359/181 |
| 2002/0131047 A1 | 9/2002 | Zarrabian et al. | |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002099 A1 | 1/2003 | Sayyah et al. | |
| 2003/0002120 A1 | 1/2003 | Choa | |
| 2003/0063647 A1 | 4/2003 | Yoshida et al. | |
| 2003/0067952 A1 | 4/2003 | Tsukiji et al. | |
| 2003/0077031 A1 | 4/2003 | Zhang et al. | |
| 2003/0099018 A1 | 5/2003 | Singh et al. | |
| 2003/0147114 A1 * | 8/2003 | Kang et al. | 359/245 |
| 2003/0156774 A1 * | 8/2003 | Conradi | 385/2 |
| 2003/0161370 A1 | 8/2003 | Buimovich et al. | |

| | | | |
|---|---|---|---|
| 2003/0169787 A1 | 9/2003 | Vergaftman et al. | |
| 2003/0193974 A1 | 10/2003 | Frankel et al. | |
| 2003/0210912 A1 | 11/2003 | Leuthold | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0081386 A1 | 4/2004 | Morse et al. | |
| 2004/0086012 A1 | 5/2004 | Kitaoka et al. | |
| 2004/0096221 A1 | 5/2004 | Mahgerefteh et al. | |
| 2004/0109698 A1* | 6/2004 | Kim et al. | 398/199 |
| 2004/0218890 A1 | 11/2004 | Mahgerefteh et al. | |
| 2004/0234200 A1 | 11/2004 | Jennings et al. | |
| 2005/0074244 A1* | 4/2005 | Roberts et al. | 398/139 |
| 2005/0100345 A1 | 5/2005 | Welch et al. | |
| 2005/0111852 A1 | 5/2005 | Mahgerefteh et al. | |
| 2005/0152702 A1 | 7/2005 | Mahgerefteh et al. | |
| 2005/0163512 A1 | 7/2005 | Tayebati et al. | |
| 2005/0169638 A1 | 8/2005 | Tayebati et al. | |
| 2005/0169642 A1 | 8/2005 | Mahgerefteh et al. | |
| 2005/0175356 A1 | 8/2005 | McCallion et al. | |
| 2005/0196177 A1 | 9/2005 | Moran | |
| 2005/0206989 A1 | 9/2005 | Marsh | |
| 2005/0213993 A1 | 9/2005 | Kazemi-Nia et al. | |
| 2005/0249509 A1 | 11/2005 | Nagarajan et al. | |
| 2005/0265733 A1* | 12/2005 | Kao et al. | 398/188 |
| 2005/0271394 A1* | 12/2005 | Whiteaway et al. | 398/188 |
| 2005/0286829 A1 | 12/2005 | Mahgerefteh et al. | |
| 2005/0286909 A1 | 12/2005 | Kish, Jr. et al. | |
| 2006/0002718 A1 | 1/2006 | Matsui et al. | |
| 2006/0008272 A1 | 1/2006 | Abeles et al. | |
| 2006/0018666 A1 | 1/2006 | Matsui et al. | |
| 2006/0029358 A1 | 2/2006 | Mahgerefteh et al. | |
| 2006/0029396 A1 | 2/2006 | Mahgerefteh et al. | |
| 2006/0029397 A1 | 2/2006 | Mahgerefteh et al. | |
| 2006/0078336 A1 | 4/2006 | McNicol et al. | |
| 2006/0078338 A1 | 4/2006 | Johnson et al. | |
| 2006/0120416 A1 | 6/2006 | Hu et al. | |
| 2006/0193636 A1 | 8/2006 | Katagiri et al. | |
| 2006/0228120 A9 | 10/2006 | McCallion et al. | |
| 2006/0233556 A1 | 10/2006 | Mahgerefteh et al. | |
| 2006/0239306 A1 | 10/2006 | Donohoe et al. | |
| 2006/0245763 A1* | 11/2006 | Ishida et al. | 398/186 |
| 2006/0274993 A1 | 12/2006 | Mahgerefteh et al. | |
| 2007/0286608 A1 | 12/2007 | Matsui et al. | |
| 2008/0002990 A1 | 1/2008 | McCallion et al. | |
| 2008/0037608 A1 | 2/2008 | Zhou et al. | |
| 2008/0159747 A1 | 7/2008 | Mahgerefteh et al. | |
| 2008/0166134 A1 | 7/2008 | McCallion et al. | |
| 2008/0181619 A1 | 7/2008 | Heismann | |
| 2008/0187325 A1 | 8/2008 | McCallion et al. | |
| 2008/0193132 A1 | 8/2008 | Matsui et al. | |
| 2008/0193144 A1 | 8/2008 | Zhou et al. | |
| 2008/0232815 A1* | 9/2008 | Shioiri et al. | 398/140 |
| 2008/0240180 A1 | 10/2008 | Matsui et al. | |
| 2008/0247763 A1 | 10/2008 | Mahgerefteh et al. | |
| 2008/0247765 A1 | 10/2008 | Mahgerefteh et al. | |
| 2008/0291950 A1 | 11/2008 | McCallion et al. | |
| 2009/0060526 A1 | 3/2009 | Matsui et al. | |
| 2009/0080905 A1 | 3/2009 | Olsson | |
| 2009/0196631 A1 | 8/2009 | Daghighian et al. | |
| 2009/0238224 A1 | 9/2009 | Ye | |
| 2009/0269069 A1 | 10/2009 | Mahgerefteh et al. | |
| 2009/0297165 A1* | 12/2009 | Nakamoto | 398/155 |
| 2009/0304395 A1* | 12/2009 | Hong et al. | 398/189 |
| 2010/0008679 A1 | 1/2010 | Cole | |
| 2010/0098436 A1 | 4/2010 | Mahgerefteh et al. | |
| 2010/0279447 A1 | 11/2010 | Matsui et al. | |
| 2010/0311195 A1 | 12/2010 | Matsui et al. | |

FOREIGN PATENT DOCUMENTS

| | | |
|---|---|---|
| CN | 1236891 | 1/1999 |
| CN | 200380108289.9 | 11/2007 |
| CN | 200380108289.9 | 8/2008 |
| CN | 200380108289.9 | 11/2008 |
| CN | 200580015245.0 | 9/2009 |
| CN | 200580012705.4 | 3/2010 |
| CN | 200580015245.0 | 3/2010 |
| CN | 2005800378071 | 5/2010 |
| CN | 200880009551.7 | 7/2010 |
| EP | 0524758 | 7/1992 |
| EP | 602659 | 6/1994 |
| EP | 05731268.8 | 1/2008 |
| EP | 05764209.2 | 6/2009 |
| EP | 05731268.8 | 5/2010 |
| GB | 2 107 147 | 4/1983 |
| JP | 2001320328 | 16/2001 |
| JP | 58-075340 | 5/1983 |
| JP | 62-189832 | 8/1987 |
| JP | 09-214427 | 8/1997 |
| JP | 11-031859 | 2/1999 |
| JP | 2000105313 | 4/2000 |
| JP | 2001-036477 | 2/2001 |
| JP | 2001-284711 | 10/2001 |
| JP | 2001291928 | 10/2001 |
| JP | 2002243935 | 8/2002 |
| JP | 2002267834 | 9/2002 |
| JP | 2002267998 | 9/2002 |
| JP | 2002-311235 | 10/2002 |
| JP | 2004-551835 | 7/2008 |
| JP | 2004-551835 | 3/2010 |
| JP | 2009-504345 | 4/2010 |
| JP | 2009-504345 | 10/2010 |
| KR | 102008-7027139 | 4/2010 |
| WO | 9905804 | 2/1999 |
| WO | 0104999 | 1/2001 |
| WO | WO 0117076 | 3/2001 |
| WO | WO 0118919 | 3/2001 |
| WO | 03005512 | 1/2003 |

OTHER PUBLICATIONS

Alexander et al., Passive Equalization of Semiconductor Diode Laser Frequency Modulation, Journal of Lightwave Technology, Jan. 1989, 11-23, vol. 7, No. 1.

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled Microring Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55-um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb. 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutali et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single-Mode Fiber Using the Method of Dispersion-Supported Transmission, Journal of Lightwave Technology, Oct. 1994, 1720, vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

Corvini, P.J. et al., Computer Simulation of High-Bit-Rate Optical Fiber Transmission Using Single-Frequency Lasers, Journal of Lightwave Technology, Nov. 1987, 1591-1596, vol. LT-5, No. 11.

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

Matsui, Yasuhiro et al, Chirp-Managed Directly Modulated Laser (CML), IEEE Photonics Technology Letters, Jan. 15, 2006, pp. 385-387, vol. 18, No. 2.

Nakahara, K. et al, 40-Gb/s Direct Modulation With High Extinction Ratio Operation of 1.3-μm InGaAl as Multiquantum Well Ridge Waveguide Distributed Feedback Lasers, IEEE Photonics Technology Leters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

Dischler et al., Experimental Assessment of a Direct Detection Optical OFDM System Targeting 10Gb/s and Beyond, Optical Fiber Communication/National Fiber Optic Engineers Conference, Feb. 24-28, 3 pages, San Diego, CA.

Dong Jae Shin, et al., Low-cost WDM-PON with Colorless Bidirectional Tranceivers, Journal of Lightwave Technology, Jan. 2006, pp. 158-165, vol. 24, No. 1.

Freund et al, 30 Gbit/s RZ 8-PSK Transmission over 2800 km Standard Single Mode Fibre without Inline Dispersion Compensation, 2007, 3 pages.

Kikuchi, Nobuhiko et al., Experimental Demonstration of Incoherent Optical Multilevel Staggered-APSK (Amplitude- and Phase-Shift Keying) Signaling, Optical Fiber Communication/National Fiber Optic Engineers Conference, Feb. 24-28, 2008, 3 pages, San Diego, CA.

Kiyoshi Fukuchi, Proposal and Feasibility Study of a 6-level PSK modulation format based system for 100 Gg/s migration, 2007, 3 pages.

Lammert et al., MQW DBR Lasers with Monolithically Integrated External-Cavity Electroabsorption Modulators Fabricated Without Modification of the Active Region, IEEE Photonics Technology Letters, vol. 9, No. 5, May 1997, pp. 566-568.

Mahgerefteh, D. and Fan, F., Chirp-managed-laser technology delivers > 250-km reach, Lightwave Online, 2005, PennWell Corporation. Accessed online Jul. 1, 2009 at: http://www.finisar.com/download_31wMeaCML_Application%20White%20Paper-LW.pdf.

Mahgerefteh et al., Chirp managed laser (CML): A compact transmitter for dispersion tolerant 10 Gb/s networking applications; Optical Fiber Communication Conference, 2006 and the 2006 National Fiber Optic Engineers Conference. OFC 2006, Mar. 5-10, 2006; Digital Object Identifier: 10.1109/OFC.2006.215459.

Sekine, Kenro et al., Advanced Multi-level Transmission Systems, Optical Fiber Communication/National Fiber Optic Engineers Conference, Feb. 24-28, 2008, 3 pages, San Diego, CA.

Tokle, Torger et al., Advanced Modulation Formats for Transmission Systems, Optical Fiber Communication/National Fiber Optic Engineers Conference, Feb. 24-28, 2008, 3 pages, San Diego, CA.

Wesstrom et al., State-of-the-art performance of widely tunable modulated grating Y-branch lasers; Optical Fiber Communication Conference, 2004. OFC 2004, vol. 1, No., pp. 2, vol. (1800), Feb. 23-27, 2004; doi: 10.1109/OFC.2004.1349295.

U.S. Appl. No. 11/964,315, Aug. 25, 2010, Office Action.
U.S. Appl. No. 11/964,315, Feb. 4, 2011, Notice of Allowance.
U.S. Appl. No. 11/964,321, Aug. 25, 2010, Office Action.
U.S. Appl. No. 11/964,321, Dec. 29, 2010, Notice of Allowance.
U.S. Appl. No. 12/014,676, Oct. 4, 2010, Office Action.
U.S. Appl. No. 12/014,676, Mar. 18, 2011, Notice of Allowance.
U.S. Appl. No. 12/014,676, Jun. 29, 2011, Supp Notice of Allowance.
U.S. Appl. No. 12/017,957, Nov. 5, 2010, Office Action.
U.S. Appl. No. 12/017,957, Apr. 25, 2011, Office Action.
U.S. Appl. No. 12/025,573, Oct. 6, 2010, Office Action.
U.S. Appl. No. 12/025,573, Feb. 7, 2011, Notice of Allowance.
U.S. Appl. No. 12/028,675, Oct. 27, 2010, Office Action.
U.S. Appl. No. 12/028,675, Mar. 24, 2011, Notice of Allowance.
U.S. Appl. No. 12/028,678, Dec. 8, 2010, Office Action.
U.S. Appl. No. 12/028,678, filed May 16, 2011, Notice of Allowance.
U.S. Appl. No. 12/047,017, Jun. 1, 2010, Restriction Requirement.
U.S. Appl. No. 12/047,017, Aug. 6, 2010, Office Action.
U.S. Appl. No. 12/047,017, Sep. 27, 2010, Notice of Allowance.
U.S. Appl. No. 12/053,344, Apr. 1, 2010, Office Action.
U.S. Appl. No. 12/053,344, Sep. 3, 2010, Notice of Allowance.
U.S. Appl. No. 12/115,337, Mar. 4, 2010, Office Action.
U.S. Appl. No. 12/115,337, Aug. 20, 2010, Office Action.
U.S. Appl. No. 12/115,337, Oct. 28, 2010, Notice of Allowance.
U.S. Appl. No. 12/184,137, Dec. 2, 2010, Notice of Allowance.
U.S. Appl. No. 12/017,957, Oct. 26, 2011, Notice of Allowance.
U.S. Appl. No. 12/188,407, Jun. 30, 2011, Office Action.
U.S. Appl. No. 12/188,407, Mar. 2, 2011, Office Action.
U.S. Appl. No. 12/839,310, Apr. 28, 2011, Ex Parte Action.
U.S. Appl. No. 12/839,310, Sep. 27, 2011, Office Action.
U.S. Appl. No. 12/566,471, Jan. 20, 2011, Office Action.
U.S. Appl. No. 12/566,471, Jul. 27, 2011, Office Action.
U.S. Appl. No. 12/566,471, Dec. 5, 2011, Notice of Allowance.
U.S. Appl. No. 12/110,071, May 12, 2011, Office Action.
U.S. Appl. No. 12/857,465, Nov. 18, 2011, Office Action.
U.S. Appl. No. 12/171,201, Jul. 19, 2011, Notice of Allowance.

* cited by examiner

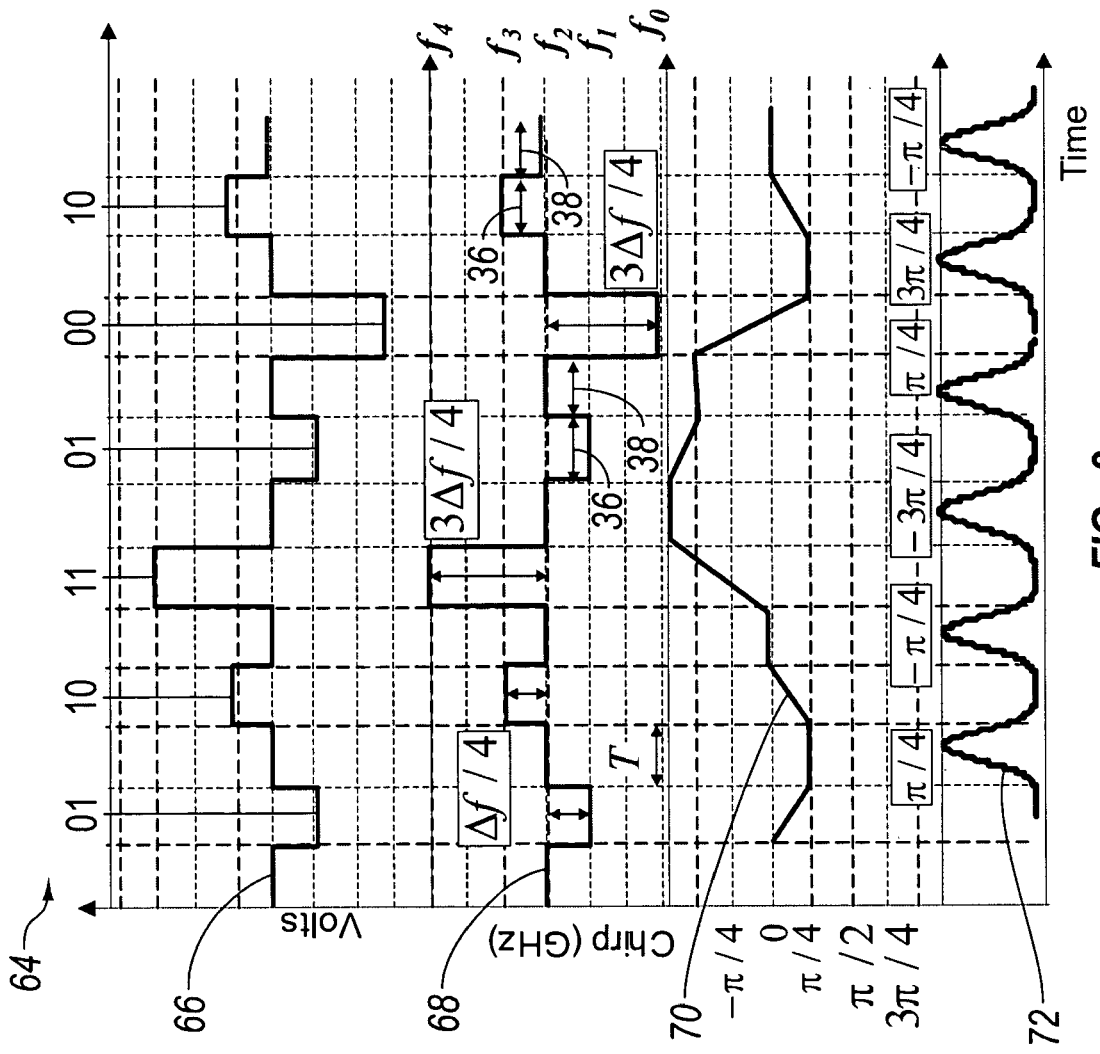
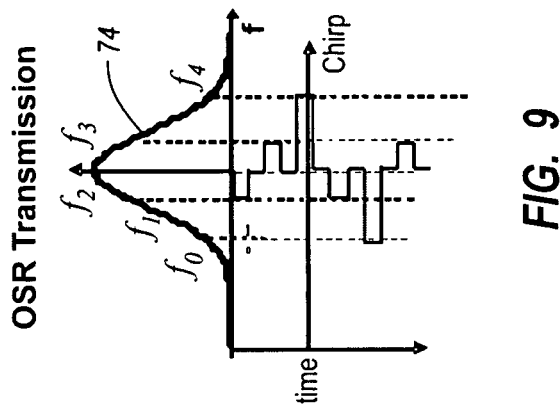
FIG. 8
FIG. 9

CHIRPED LASER WITH PASSIVE FILTER ELEMENT FOR DIFFERENTIAL PHASE SHIFT KEYING GENERATION

CROSS-REFERENCE TO RELATED APPLICATIONS

This application is a continuation-in-part of U.S. patent application Ser. No. 12/014,676 filed Jan. 15, 2008 and U.S. patent application Ser. No. 11/784,395 filed Apr. 6, 2007. This application claims the benefit of U.S. Provisional Application Ser. No. 60/931,359 filed May 23, 2007.

BACKGROUND OF THE INVENTION

The Field of the Invention

In differential phase shift keying (DPSK) format, an input digital electrical signal representing 1s and 0s is converted to an optical signal in which the information is encoded in the phase of a continuous wave (CW), constant amplitude signal. The modulation rule is that given an input random digital sequence of 1s and 0 bits, the phase of the CW signal is changed by $\pi$ for every occurrence of a 0 bit while the phase is unchanged for occurrence of a 1 bit.

The advantage of this scheme is that every bit carries energy, in contrast with non-return to zero on-off keying (OOK), where the 1s have energy while the 0s have no energy. The advantage is realized by using a 1 bit delayed interferometer at the receiver together with a balanced receiver. The function of the 1 bit delayed interferometer is to convert the phase modulation to amplitude modulation. This interferometer has two outputs, 1) the sum of each bit with a one bit delayed bit, 2) the difference of each bit with a one bit delayed bit. Since the input DPSK signal is split between the two arms of the interferometer, the power in each arm is reduced by a factor of 2.

The decision threshold is placed at 0 volts, so that the "distance" between the 1 and 0 bits is now 2; hence the 3 dB advantage. For a RZ-DPSK transmitter, the output of a CW laser is preferably modulated by a clock with a 30%-50% duty cycle or at the bit rate in order to further improve the sensitivity at the receiver. The output intensity is therefore a pulse train with 30-50% duty cycle at the bit rate, while the phases of the pulses follow the DPSK rule above.

Prior art RZ-DPSK transmitters are complicated and expensive, requiring multiple modulators that include multiple optical components that must be precisely manufactured and calibrated. A typical RZ-DPSK transmitter includes a CW laser, a first modulator to encode DPSK data onto the laser output, and a second modulator to impose a clock intensity modulation on the output. The modulators used in prior art are typically two LiNbO$_3$ Mach-Zehnder interferometers which are bulky and require a high power consumption drivers. They are therefore not appropriate for small form factor transponders.

In view of the foregoing, it would be an advancement in the art to provide a transmitter that is compact, inexpensive to manufacture, and requires a low power consumption driver.

BRIEF SUMMARY OF THE INVENTION

In one aspect of the invention, N data streams comprising data symbols are generated. For each of a plurality of sets of N simultaneous data symbols of the N data streams, signals are imposed on L of a plurality of signal lines, with the value of L corresponding to values of the N simultaneous data symbols. Signals on the plurality of signal lines are ANDed with a clock signal synchronized with the N data streams to produce RZ signals. The RZ signals are summed and the summed signal is input to a laser that produces an output having frequency modulation corresponding to the magnitude of the summed signal.

In another aspect of the invention the RZ signals are summed with each other and a delayed version of the clock signal, where rising edges of the delayed version of the clock signal are substantially simultaneous with rising edges of the RZ signal.

In another aspect of the invention, the output of the laser is transmitted through an optical spectrum reshaper (OSR).

In another aspect of the invention a modulation signal is generated by coupling a digital signal source to a binary-to-thermometer coder configured to output signals on L of a plurality of signal lines with the value of L corresponding to one or more data symbols received from the digital signal source. The plurality of signal lines are coupled to a summing circuit that produces an output signal corresponding to a sum of signals on the plurality of output signal lines. A laser is coupled to the summing circuit and is configured to generate a frequency modulated signal according to the output current.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 8 is a timing diagram illustrating signal levels at points within a transmitter generated using another alternative method for generating a DQPSK signal in accordance with an embodiment of the present invention;

FIG. 9 is a plot of an optical spectrum reshaper transmission function and frequency levels used for phase modulation in accordance with the method of FIG. 8;

DETAILED DESCRIPTION OF THE PREFERRED EMBODIMENTS

Figure 1:
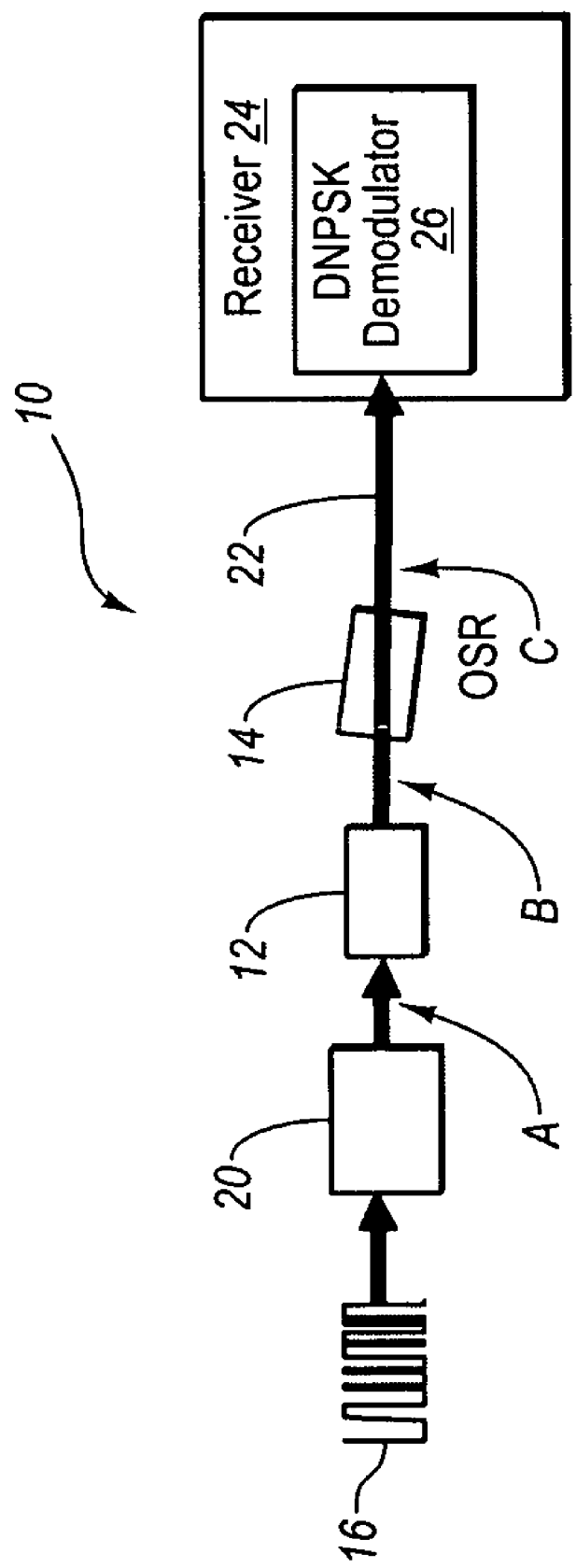
FIG. 1 illustrates a transmitter for generating a DNPSK signal in accordance with an embodiment of the present invention.

The quality and performance of a digital fiber optic transmitter is determined by the distance over which the transmitted digital signal can propagate without severe distortions. The bit error rate (BER) of the signal is measured at a receiver after propagation through dispersive fiber and the optical power required to obtain a certain BER, typically $10^{-12}$, called the sensitivity, is determined. The difference in sensitivity at the output of the transmitter with the sensitivity after propagation is called dispersion penalty. This is typically characterized the distance over which a dispersion penalty reaches a level of ~1 dB. A standard 10 Gb/s optical digital transmitter, such as an externally modulated source can transmit up to a distance of ~50 km in standard single mode fiber at 1550 nm before the dispersion penalty reaches the level of ~1 dB, called the dispersion limit. The dispersion limit is determined by the fundamental assumption that the digital signal is transform limited, i.e. the signal has no time varying phase across its bits and has a bit period of 100 ps, or 1/(bit rate). Another measure of the quality of a transmitter is the absolute sensitivity after fiber propagation.

Three types of optical transmitters are presently in use in prior art fiber optic systems: (i) directly modulated laser (DML), (ii) Electroabsorption Modulated Laser (EML), and (iii) Externally Modulated Mach-Zehnder (Mz). For transmission in standard single mode fiber at 10 Gb/s, and 1550 nm, it has generally been assumed that Mz modulators and EMLs can have the longest reach, typically reaching 80 km. Using a special coding scheme, referred to as phase shaped binary transmission (duobinary), Mz transmitters can reach 200 km. On the other hand, directly modulated lasers (DML) reach <5 km because their inherent time dependent chirp causes severe distortion of the signal after this distance.

By way of example, various systems for long-reach lightwave data transmission (>80 km at 10 Gb/s) through optical fibers which increase the reach of DMLs to >80 km at 10 Gb/s in single mode fiber are disclosed in (i) U.S. patent application Ser. No. 10/289,944, filed Nov. 6, 2002 by Daniel Mahgerefteh et al. for POWER SOURCE FOR A DISPERSION COMPENSATION FIBER OPTIC SYSTEM; (ii) U.S. patent application Ser. No. 10/680,607, filed Oct. 6, 2003 by Daniel Mahgerefteh et al. for FLAT DISPERSION FREQUENCY DISCRIMINATOR (FDFD); and (iii) U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR; which patent applications are hereby incorporated herein by reference.

In such systems, a Frequency Modulated (FM) source is followed by an Optical Spectrum Reshaper (OSR) which uses the frequency modulation to increase the amplitude modulated signal and to increase the dispersion tolerance of the resulting signal by introducing phase correlations between the bits, resulting in destructive inter-symbol interference between bits after fiber propagation. Such transmitters include the Chirp Managed Laser (CML)™. In some transmitters, the frequency modulated source includes a directly modulated laser (DML). The Optical Spectrum Reshaper (OSR), sometimes referred to as a frequency discriminator, can be formed by an appropriate optical element that has a wavelength-dependent transmission function. The OSR can be adapted to convert frequency modulation to amplitude modulation as well as to convert amplitude modulation to frequency modulation.

In some embodiments of the present invention, the chirp properties of the frequency modulated source are separately adapted and then further reshaped by configuring the OSR to further extend the reach of the transmitter to over 250 km on standard single mode fiber at 10 Gb/s and 1550 nm.

The novel system of the present invention combines, among other things, selected features of systems described in (i) U.S. Provisional Patent Application Ser. No. 60/548,230, filed Feb. 27, 2004 by Yasuhiro Matsui et al. for OPTICAL SYSTEM COMPRISING AN FM SOURCE AND A SPECTRAL RESHAPING ELEMENT; (ii) U.S. Provisional Patent Application Ser. No. 60/554,243, filed Mar. 18, 2004 by Daniel Mahgerefteh et al. for FLAT CHIRP INDUCED BY FILTER EDGE; (iii) U.S. Provisional Patent Application Ser. No. 60/566,060, filed Apr. 28, 2004 by Daniel Mahgerefteh et al. for A METHOD OF TRANSMISSION USING PARTIAL FM AND AM MODULATION; (iv) U.S. Provisional Patent Application Ser. No. 60/657,737, filed May 3, 2004 by Daniel Mahgerefteh et al. for ADIABATIC FREQUENCY MODULATION (AFM); (v) U.S. Provisional Patent Application Ser. No. 60/569,769, filed May 10, 2004 by Daniel Mahgerefteh et al. for FLAT CHIRP INDUCED BY AN OPTICAL FILTER EDGE; (vi) U.S. patent application Ser. No. 11/068,032, filed Feb. 28, 2005 by Daniel Mahgerefteh et al. for OPTICAL SYSTEM COMPRISING AN FM SOURCE AND A SPECTRAL RESHAPING ELEMENT; (vii) U.S. patent application Ser. No. 11/084,633, filed Mar. 18, 2005 by Daniel Mahgerefteh et al. for METHOD AND APPARATUS FOR TRANSMITTING A SIGNAL USING SIMULTANEOUS FM AND AM MODULATION; (viii) U.S. patent application Ser. No. 11/084,630, filed Mar. 18, 2005 by Daniel Mahgerefteh et al. for FLAT-TOPPED CHIRP INDUCED BY OPTICAL FILTER EDGE; and (ix) U.S. patent application Ser. No. 11/051,893, filed Feb. 4, 2005 by Yasuhiro Matsui et al. for ADIABATICALLY FREQUENCY MODULATED SOURCE, which patent applications are hereby incorporated herein by reference.

The present invention describes a device for generation of an optical differentially N-phase shift keyed (DNPSK) return to zero (RZ) signal using a transmitter, such as those described in above referenced patent applications, operated according to a novel method disclosed herein.

Referring to FIG. 1, a transmitter 10 includes an FM source 12, such as a directly modulated laser, and an optical spectrum reshaper (OSR) 14, used to generate a DPSK signal, such as an RZ-DPSK signal, without the use of external modulators. The OSR 14 may include a multi-cavity etalon filter, a single or multi-cavity ring resonator filter, an arrayed waveguide grating (AWG) filter, and fiber Bragg grating filter.

A binary electrical digital data stream 16 is fed into a digital multi-level transformer (DMT) 20, which converts the two level input to, for example a three level output according to the procedure described below. Alternatively, the DMT 20 may be programmed to process multi-bit sequences, such that the multilevel DMT 20 outputs more than two levels each corresponding to a unique bit sequence.

The three, or more, level digital signal from the DMT 20 is used to drive the FM source 12 which converts the input digital 3 level signal to a multi-level optical signal with both frequency and intensity modulation. The output of the FM source 12 then transmitted through the OSR 14 and into an optical fiber 22 coupled to a receiver 24. The receiver 24 includes a DNPSK demodulator 26 capable of detecting phase differences in a series of pulses transmitted to the receiver 24 in order to reconstruct the digital data stream 16.

The amplitude of the electrical signal is chosen to generate a particular frequency excursion and amplitude excursion by the FM source 12 corresponding to the amplitude of the input digital signal. The optical output of the FM source 12 is passed through the OSR 14, which may have two functions: 1) to increase the amplitude modulation of the input signal. 2) to convert the input adiabatic frequency excursion to a flat topped chirp with nearly instantaneous abrupt phase shifts near the null outputs of the signal, as described in U.S. patent application Ser. No. 11/084,630, filed Mar. 18, 2005, which is incorporated herein by reference.

Figure 2:
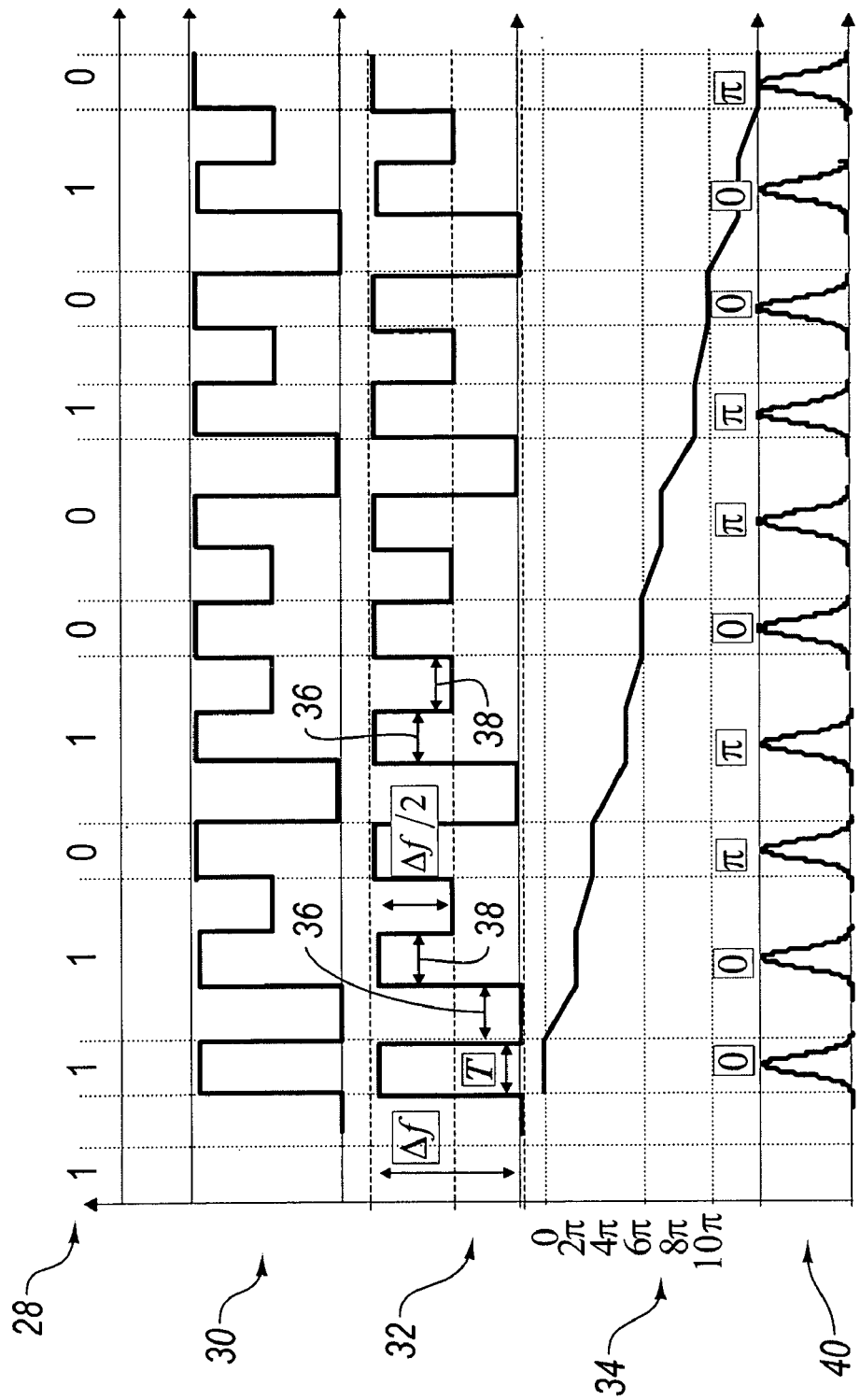
FIG. 2 is a timing diagram illustrating signal levels at points within a transmitter used to generate a DPSK signal in accordance with an embodiment of the present invention.

To further elucidate this description, consider the input binary digital bit sequence $a_n$ = ... 1 1 1 0 1 0 0 1 0 1 0 0 0 1 1 0 1 0 1 1 0 1 1. FIG. 2 shows the bit sequence 28, and pulse shapes at various points in the transmitter chain labeled A, B, and C. The data sequence is input to the DMT 20, which generates, at point A, the signal 30 of FIG. 2 having the pulse shapes shown. The output of the DMT 20 drives the FM source 12, which generates an optical signal having the illustrated frequency profile 32 and phase progression 34 at point B. The frequency profile 32 includes pulses each including both a phase modulated portion 36 and a fixed phase portion 38. For purpose of this disclosure "fixed phase" signifies that that fixed phase portion 38 has a substantially constant frequency about equal to a carrier frequency across its duration and therefore does not experience a phase shift to the same degree as the phase modulated portion 36, enabling the phase shift across the phase modulated portions to substantially define the phase difference between contiguous fixed phase portions However, in some embodiments, the fixed phase portion 38 has a non-ideal pulse shape such that some phase variation occurs. In some embodiments, the phase difference across the fixed phase portion is less than $\pi/8$, preferably less than $\pi/16$, and more preferably less than $\pi/32$. The phase modulated portion 36 has a frequency chosen to modulate the phase of the immediately following fixed phase portion 38 in order to encode information in the phase of the fixed phase portion 38. The fixed phase portion 38 may have a 50% duty cycle, however other duty cycles such as from 30% to 50% or from 50% to 60% may be used.

The phase modulated portions 36 and fixed phase pulse portions 38 are produced by the FM source 12 in response to the signal 30 which is generated by the DMT 20 according to the following rules. When a bit is equal to the previous bit, $b_n=b_{n-1}$, the signal 30 at point A drops to 0 (changes by V), stays at the 0 value for a time A, preferably equal to 50% of the bit duration to generate the phase modulated portion 36. The signal 30 then returns to the value V for the remainder of the duration of the bit to generate the fixed phase portion 38 for that bit. Thus, when the bit is equal to the preceding bit, $b_n=b_{n-1}$, the frequency profile 32 of the laser output at point B drops from a peak frequency $f_0$ to a low frequency $f_2$ for a time T, and returns to the peak frequency $f_0$ for the remainder of the bit duration.

When a bit is different from the previous bit, $b_n \neq b_{n-1}$, the phase signal 30 drops to V/2 and stays at that value for a time period equal to T to generate the phase modulated portion 36. The signal 30 then returns to the value V for the remainder of the bit duration to generate the fixed-phase portion 38 for that bit. Thus, when the bit is different from the last value, $b_n \neq b_{n-1}$, the frequency profile 32 of the laser output at point B drops from a peak frequency $f_0$ to an intermediate frequency $f_1$ for a time period equal to T, and returns to the peak frequency $f_0$ for the remainder of the bit duration.

This choice of voltage output guarantees the generation of the proper phase relation between bits at the output of a frequency modulated source, as described below. The FM source 12, such as a DFB laser, is driven by the voltage pattern at point A, and generates a frequency and amplitude modulated output waveform at point B having the illustrated frequency profile 32 and phase progression 34. The value of the drive voltage, V, may be chosen to generate a frequency excursion which is equal to the bit rate of the digital signal, e.g. 10 GHz for a 10 Gb/s data stream with 50% duty cycle. More generally, the full frequency excursion, $\Delta f$ is chosen such that $\Delta f \times T=1$, where T is the duration of the 0 value and is equal to ½ the bit period for a 50% duty cycle pulse.

The voltage is determined by the so called FM efficiency of the source, $\eta_{FM}$, in GHz/V; in other words: $\Delta f = \eta_{FM} V$. The phase of the optical signal at the output of the DFB is the time integral of the frequency excursion as shown in FIG. 2. For example for a 10 Gb/s return-to-zero (RZ) data with 50% duty cycle, the phase of the frequency modulated signal slips by 10 GHz×2π×50 ps=2π, when the full frequency excursion $\Delta f=10$ GHz is applied.

When the adjacent bits are different, the DMT 20 produces ½ the voltage; generating 5 GHz frequency excursion for the case of 10 Gb/s RZ. In this case the phase of the signal slips by 10 GHz×2π×50 ps=π, and the resulting adjacent pulses will have a π phase shift between them. The output of the FM source is passed through the OSR 14 which increases the amplitude excursion and flattens the chirp, as shown by the output pulses 40 at point C in the transmitter train. The OSR 14 may have the functionality described in the patent applications incorporated herein by reference. As shown in FIG. 2 the intensity at point C is an RZ-DPSK signal wherein each bit carries equal energy and the data is encoded in the phase of the bits.

The amplitude of the resulting pulses at the output of the FM source 12 is not shown, but typically follows the frequency excursion. If the source has independent control for amplitude and frequency excursion, then the amplitude can be adjusted separately to generate an RZ pulse shape. In this case the amplitude modulation may require a separate electrical signal, which is programmed to provide the desired amplitude modulation after the OSR 14. For example, the amplitude modulation is reduced for bits having large frequency excursion and increased for bits having small frequency modulation such that the output amplitude of high level and low levels after OSR 14 are about the same. The output amplitude after the OSR preferably approximately satisfies the following equation:

$$AM(t) + FM(t) \times (OSR\ slope) = constant \quad (1)$$

wherein AM is amplitude modulation depth in dB, which is defined as the ratio of the 1 level to the 0 level, FM is the frequency modulation in GHz, slope is slope of the OSR 14 in dB/GHz. In the example above, if the FM source 12 has independent control of output amplitude, the AM component would be programmed to output voltage $V_{AM}$ when the frequency is at half the maximum, i.e. $\Delta f/2$ and the amplitude is set to $V_{AM}/2$ when the frequency excursion is at maximum, i.e. $\Delta f$. Here $V_{AM}$ is chosen to provide the appropriate amplitude response, and depends on the AM slope efficiency of the source.

Figure 3:
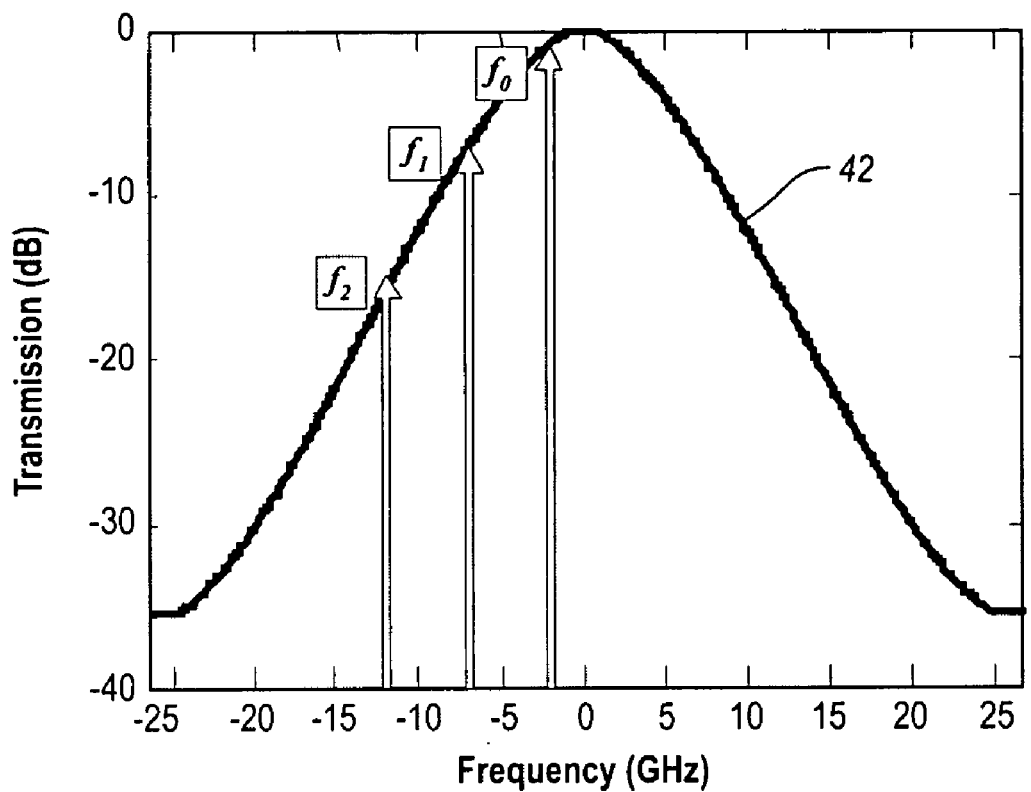
FIG. 3 is a plot of an optical spectrum reshaper transmission function and frequency levels used for phase modulation in accordance with an embodiment of the present invention.

FIG. 3 shows an example of an OSR transmission function 42 and the spectral positions of the various frequency values $f_0$-$f_2$ at the output of the FM source. Here the peak frequency, $f_0$, which corresponds to the highest amplitude is aligned with a relatively low loss point on the OSR 14, while the middle frequency $f_1$ is aligned to have higher loss (~10 dB). The frequency $f_2$ suffers higher loss because it is a lower frequency as shown in FIG. 3. Ideally the signal levels at the output 40 of the OSR 14 will be such that the 0 energy in the $f_1$ level and $f_2$ levels will be negligible (e.g. <−10 dB) below the energy in the peak of the 1s. In the illustrated embodiment, the OSR 14 may be used at its transmission edge and is also bandwidth limiting. A variety of OSR shapes can introduce discrimination between the various frequency components to generate the desired amplitude response after the OSR 14.

Importantly it should be noted that a key function of the OSR edge is the transformation of the adiabatic chirp at the output of the FM source 12 to flat-top chirp with abrupt phase shifts at the 0s, as has been described in U.S. Provisional Patent Application Ser. No. 60/548,230, filed Feb. 27, 2004 by Yasuhiro Matsui et al. for OPTICAL SYSTEM COMPRISING AN FM SOURCE AND A SPECTRAL RESHAPING ELEMENT; U.S. Provisional Patent Application Ser. No. 60/554,243, filed Mar. 18, 2004 by Daniel Mahgerefteh et al. for FLAT CHIRP INDUCED BY FILTER EDGE; U.S. patent application Ser. No. 11/084,630, filed Mar. 18, 2005 by Daniel Mahgerefteh et al. for FLAT-TOPPED CHIRP INDUCED BY OPTICAL FILTER EDGE; and U.S. patent application Ser. No. 11/084,633, filed Mar. 18, 2005 by Daniel Mahgerefteh et al. for METHOD AND APPARATUS FOR TRANSMITTING A SIGNAL USING SIMULTANEOUS FM AND AM MODULATION. The resulting uniform phase generated by the transfer function of the OSR 14 may advantageously be used to generate a RZ-DPSK signal with improved sensitivity.

Figure 4:
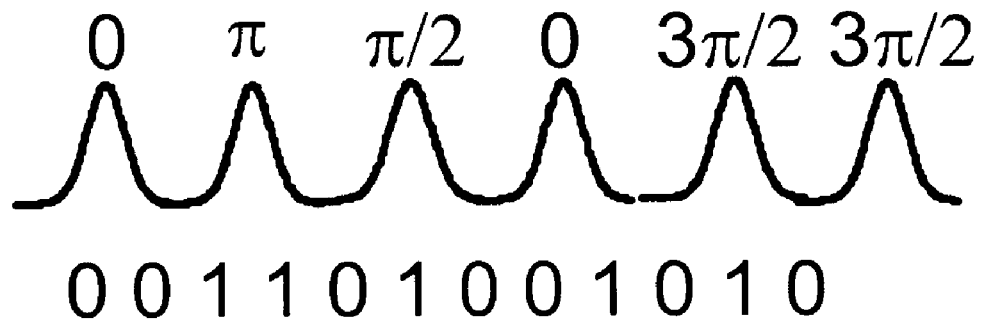
FIG. 4 is a plot of an output of one embodiment of a DQPSK output generated in accordance with an embodiment of the present invention.

Referring to FIG. 4, in alternative embodiments, the above described transmitter 10 may be used to generate a quadrature phase shift keyed signal (RZ-QPSK), for which the information is coded into four possible phases, such as $\{0, \pi/2, \pi, -\pi/2\}$. Each pulse may therefore be used to code two bits of information, i.e. 00, 01, 10, and 11, thereby doubling the rate of data transfer. In this case the multilevel digital transformer produces a four signal levels, $V_k$, such that the frequency $f_k$ of the phase modulated portions 36, satisfies the relation:

$$2\pi \Delta f_k \times T = \{2\pi, \pi/2, \pi, 3\pi/2\} \quad (2)$$

The OSR transmission function is preferably chosen such that after exiting the OSR 14, the phase modulated portion 36 of each bit is about <−1 dB below the amplitude of the fixed phase portions 38. In the case that the source has independent FM and AM modulation the amplitude may be adjusted to provide constant amplitude for the output pulses.

As is clear from the above two examples a variety of multilevel phase coded signals can be generated by using the scheme described above by adjusting the frequency excursion to generate the desired phase in the desired bit. The phase modulated portion 36 may have N frequency levels resulting in N possible phases for each fixed phase portion 38 in order to encode unique bit sequences of length $\log_2 N$. For example, an eight state PSK scheme may be used wherein each bit encodes three bits of data. In such a scheme, each fixed phase portion 38 may have a phase of $\{0, \pi/4, \pi/2, 3\pi/4, \pi, 5\pi/4, 3\pi/2\}$ each corresponding to a unique three bit sequence $\{000, 001, 010, 011, 100, 101, 110, 111\}$.

The pulses in the embodiment of FIG. 3 are return-to-zero (RZ). This means that the energy in the pulse occupies a fraction of the bit period (e.g. 50%), while the rest of the bit period carries no energy at all; i.e. the zero. Note that in the nomenclature of RZ-DPSK the zeros do not represent logical information. In other words, the 0 does not mean compliment of a 1. In RZ-DQPSK the output power reduced to the low ("zero") level between every two bits regardless of their value. Going forward we will call the "zero" level instead a low level, in order to avoid confusion with the logical 1s and 0s of the digital information.

In DQPSK, the desired changes in phase between bits, are 0, $\pi/2$, $\pi$, and $3\pi/2$. Because of the periodicity of phase, the phase shift can be shifted by an integer multiple of $2\pi$ without any change in final result. In other words, the set of phase values representing the four possible states of the incoming two bit word digital signals can be $2n\pi + (0, \pi/2, \pi, $ and $3\pi/2)$, n=0, 1, 2, 3, 4, where n is an integer.

As shown in Equation 3, the laser is driven to generate an chirp value such that the phase shift during the low level generates the desired change in optical phase satisfying; i.e. $2\pi \Delta f_k \times T = \{2\pi, \pi/2, \pi, 3\pi/2\}$. The chirp difference between the bits allows the use of the OSR 14 to generate a low level that is >10 dB below the high level for all the bits. In order to generate the low levels between two bits that are in phase; i.e. bit value 0, the above configuration of the FM source 12 requires that the phase shift be made to swing through $2\pi$, or some multiple of it, in order to generate a frequency shift between the two adjacent levels, which have the same phase and same amplitude. This increases the chirp requirements for the laser to be a maximum of 2× bit rate frequency; i.e. 20 GHz for a 10 Gb/s signal or 50 GHz for a 25 Gb/s signal with 50% duty cycle. In some cases this requirement makes laser design prohibitive.

Figure 5:
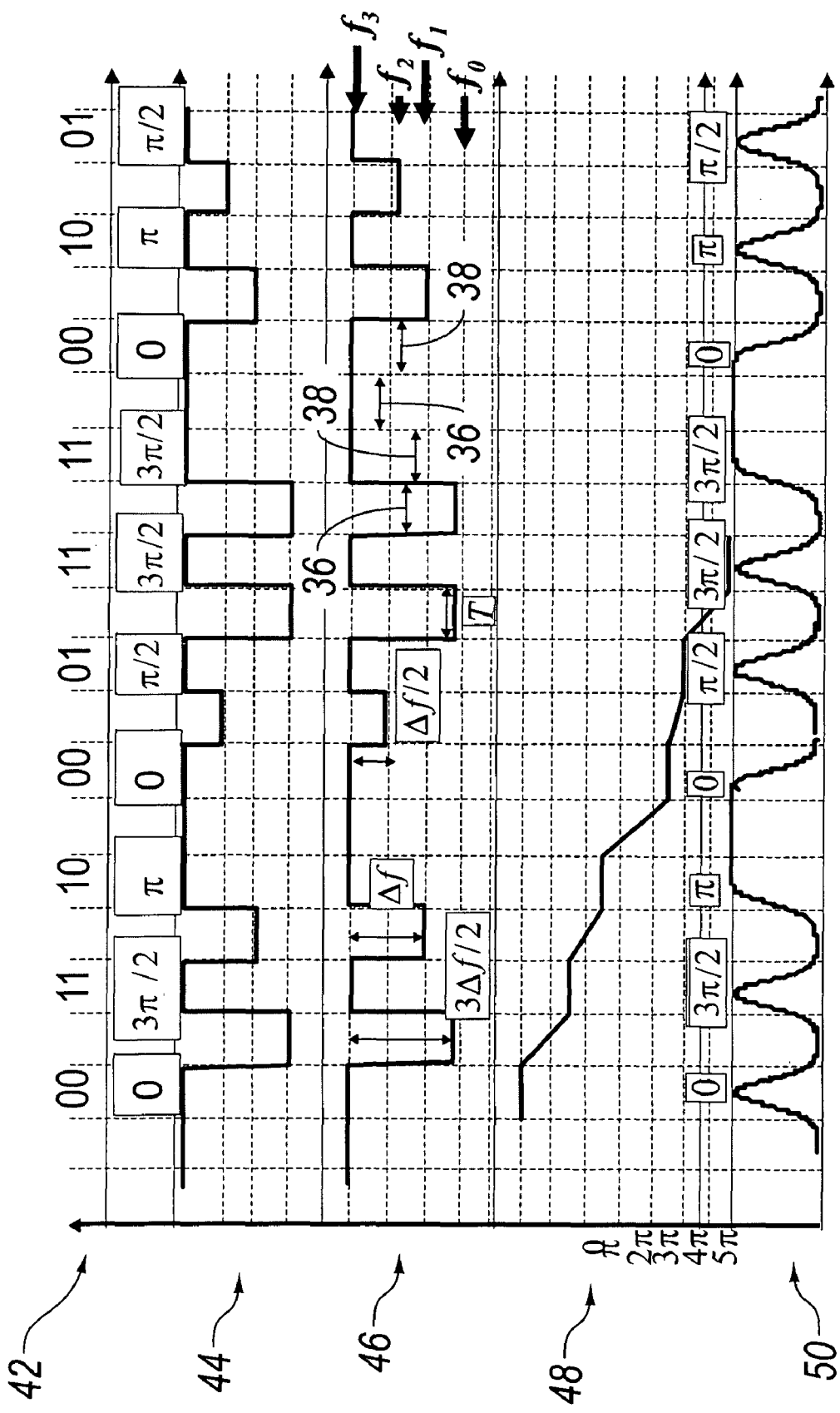
FIG. 5 is a timing diagram illustrating signal levels at points within a transmitter generated using an alternative method for generating a DQPSK signal in accordance with an embodiment of the present invention.

Accordingly, in the embodiment of FIG. 5, the requirements on the FM efficiency of the laser for generation of DPSK or DQPSK are relaxed by using a variation of the above described method in which no pulse is generated when the incoming bit is a 00; i.e. when the bit is 00, the driver output remains constant, such that the output of the FM source 12 during the entire duration of the 00 bit sequence will be equal to the frequency of the fixed phase portions 38. In some embodiments, a bit combination other than 00 is selected to generate no pulse.

FIG. 5 illustrates the values of a data signal 42, the output 44 of the DMT 20, the frequency profile 46 and phase progression 48 of the FM source 12, and the output 50 of the OSR 14 for such a differential quadrature phase shift keying (DQPSK) scheme. As is apparent in the output 50 of the OSR 14, for the 00 bit sequence, the output remains constant rather than dropping to the low interpulse level such that the phase modulated portion 36 and fixed phase portion 38 have about the same frequency.

Since the coding is differential, a 0 input phase requires that the output of the multi-level digital encoder remains unchanged. This scheme also reduces the number of output levels by one; i.e. the voltage only needs to swing to values V/2, V, and 3V/2. The corresponding frequency shifts are $f_2$, $f_1$, and $f_0$, respectively. The voltage is adjusted to generate the required chirp and depends on the FM efficiency of the laser. For a typical DFB laser the FM efficiency is typically 8-10 GHz/2V into a 50 ohm matching load resistance; i.e. 0.20-0.25 GHz/mA. Assuming the duration of the modulated phase portion of the signal to be T, the corresponding frequency shifts are given by $\Delta f$=0, ¼T, ½T, and ¾T to generate phase shifts of 0, $\pi/2$, $\pi$, and $3\pi/2$ respectively. For a 50% duty cycle RZ transmitter the duration of the phase modulated portion is half of the bit period, so that T=½B, where B is the bit rate, so that the required frequency shifts become $\Delta f$=0, B/2, B, and $3\pi/2$.

In the embodiment of FIG. 5, the OSR filter 14 may advantageously be designed such as to attenuate the frequencies $f_2$, $f_1$, $f_0$ by more than 10 dB relative to the frequency $f_3$ of the fixed phase portions. The extinction ratio of the output levels will be determined by the sum of the AM extinction ratio and the extinction resulting from FM/AM conversion, which arises by adjusting the laser wavelength to be aligned with the transmission edge of the OSR filter.

As an example consider the case of B=10 Gb/s DQPSK and a DFB laser with a FM efficiency of 10 GHz/2V. Once a multi-level driver signal is generated, such a laser can be used together with an OSR filter 14 to generate DQPSK. This is because the required chirp values for 0, $\pi/2$, $\pi$, and $3\pi/2$ are 0, 2.5 GHz, 5 GHz, and 7.5 GHz, all of which can be supplied by a multi-level driver with 2 Vpp voltage.

Figure 6:
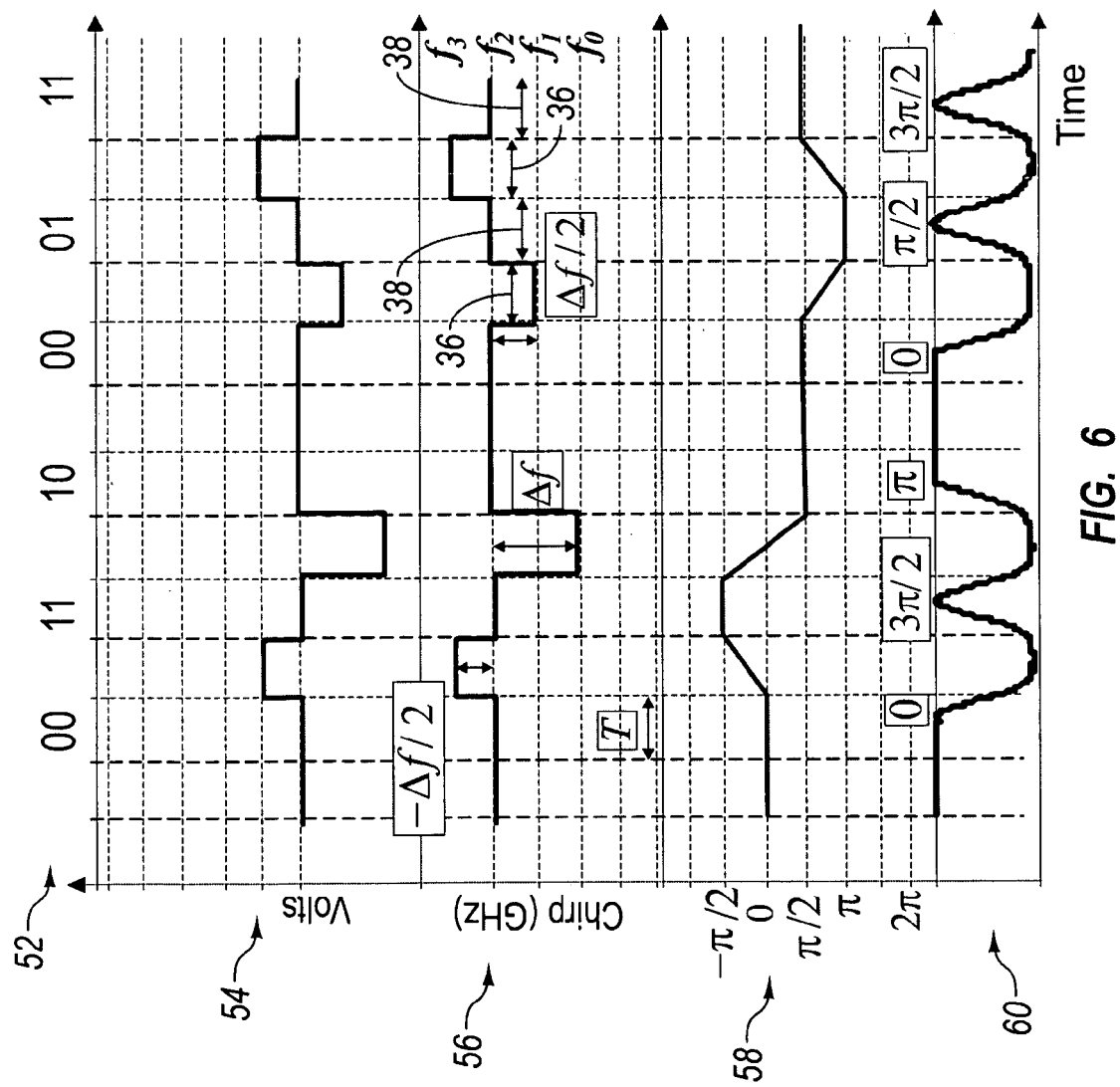
FIG. 6 is a timing diagram illustrating signal levels at points within a transmitter generated using another alternative method for generating a DQPSK signal in accordance with an embodiment of the present invention.

As noted above, the phase values representing DQPSK bits are modulo $2n\pi$. This property can be used to reduce the FM efficiency requirement on the laser, which can be advantageous since designing a high FM efficiency laser that can operate at high speeds can be challenging. FIG. 6 illustrates the values of a data signal 52, the output 54 of the multi-level digital transformer 20, the frequency profile 56 and phase progression 58 of the FM source 12, and the output 60 of the OSR 14 of a method for reducing the required FM efficiency in a DQPSK transmission scheme. In this case, the $3\pi/2$ phase is replaced by the equivalent $3\pi/2-2\pi=-\pi/2$. In order to generate a negative phase shift the driver generates a pulse that increases the chirp in an upward swing relative to the previous bit before returning to the high level value representing 0 phase. The phase modulated portion 36 of some pulses will therefore have a higher frequency than the frequency of the fixed phase portion 38. Assuming the duration of the modulated phase portion of the signal to be T, the corresponding frequency shifts are given by $\Delta f$=0, ¼T, ½T, and $-¼T$ to generate phase shifts of 0, $\pi/2$, $\pi$, and $-\pi/2$ respectively. For a 50% duty cycle RZ transmitter the duration of the phase modulated portion is half of the bit period, so that T=½B, where B is the bit rate, so that the required frequency shifts become $\Delta f$=0, B/2, B, and $-B/2$.

Given an incoming bit rate of B, and assuming a 50% duty cycle RZ, the maximum required chirp is now equal to the bit rate B. For example for a 25 Gb/s incoming signal the maximum chirp is 25 GHz. The key difference is now that the chirp can swing down or swing up relative to the 0 chirp value of the high level.

Figure 7:
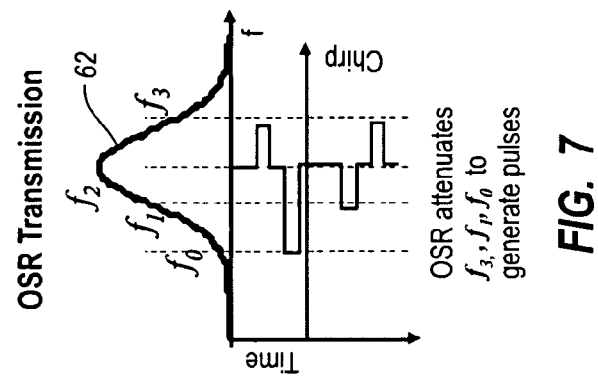
FIG. 7 is a plot of an optical spectrum reshaper transmission function and frequency levels used for phase modulation in accordance with the method of FIG. 6.

In this embodiment the OSR 14 and operating point relative to the input wavelength of the laser are preferably adjusted to attenuate the phase modulated portions 36. As shown in FIG. 7, in this embodiment, the laser center frequency $f_2$ corresponding to 0 phase change is aligned with the peak transmission of the transmission profile 62 of the OSR 14. The frequency up-shift frequency $f_3$ used to impose a $-\pi/2$ phase shift is aligned with the falling edge at the high frequency side of the transmission peak and the down shift frequencies $f_1$ and $f_0$ are aligned with the rising edge on the low frequency side of the transmission peak.

The OSR slope and bandwidth are preferably designed such that both the up-shifted and down shifted portions of the resulting signal at the output of the FM source 12 are attenuated by the OSR 14 during the low level between pulses. The result is a DQPSK signal that returns to zero when there is a phase transition between some or all bits. Although this method reduces the required FM efficiency of the source, it does impose a restrictive condition on the OSR design: the OSR bandwidth and slope are preferably adjusted so as to substantially attenuate the up-shift and down-shift components, while at the same time transmitting pulses with 50% duty cycle at the bit rate without significant pulse distortion or broadening. For example, for a 25 Gb/s input signal, the OSR slope preferably has a slope ~10 dB/12.5 GHz or ~0.8 dB/GHz, while having a bandwidth >25-30 GHz to pass the resulting pulse un-distorted, specifications that can be fulfilled by multi-cavity etalon filters.

In a second method for decreasing the FM efficiency requirement for the laser source for a DQPSK transmitter, the phase shift concept is stretched one step further to make the chirp excursions symmetric about the 0 phase change condition. FIG. 8 shows the data signal 64, drive signal 66, frequency profile 68 and phase progression 70 of the laser output, and the output 72 of the OSR 14 illustrating this method. Note that the four phase values are $\pi/4$, $3\pi/4$, $-3\pi/4$ and $-\pi/4$. Here the maximum required chirp is 3B/4, where B is the bit rate, which is lower than that required for the above described schemes. Assuming the duration of the modulated phase portion of the signal to be T, the corresponding frequency shifts are given by if ⅛T, ⅜T, $-⅛T$, and $-⅜T$ to generate phase shifts of $\pi/4$, $3\pi/4$, $3\pi/4$, and $-\pi/4$ respectively. For a 50% duty cycle RZ transmitter the duration of the phase modulated portion is half of the bit period and the required frequency shifts become $\Delta f$=B/4, 3B/4, $-B/4$, and $-3B/4$.

For example compared to the value of 2B of the scheme illustrated in FIG. 2, the required chirp is reduced by ~2.6 times, which is a significant factor. At 10 Gb/s, for example the required maximum chirp is 7.5 GHz, which is readily available from standard DFB lasers using 40 mA peak-peak modulation.

FIG. 9 shows the time resolved chirp and operating point on the transmission profile 74 of the OSR 14 for the symmetric chirp excursion scheme. The chirp swings down by amounts $\Delta f/4$ and $3\Delta f/4$ to generate phase values $\pi/4$ and $3\pi/4$ and swings up by equal amounts $\Delta f/4$ and $3\Delta f/4$ to generate phase values $-\pi/4$ and $-3\pi/4$. The laser center frequency $f_2$ is aligned with the peak transmission of the OSR transmission profile 74 so as to attenuate the up-swing frequencies $f_3$ and $f_4$ on the falling edge on the high frequency side of the OSR transmission profile 74 as well as the down swing frequencies $f_1$ and $f_0$ on the rising edge on the lower frequency side of the OSR transmission profile 74. Note that another advantage of the present embodiment is that return to zero pulses are generated for all bits since each bit corresponds to a non-zero phase transition and a corresponding chirp change, which allows pulse carving by the OSR 14.

While this method decreases the required FM efficiency of the laser, it requires different design criteria on the OSR 14. For example for a bit rate of 10 Gb/s, the OSR 14 is preferably designed to have an average slope of 10 dB/2.5 GHz ~4 dB/GHz to be able to attenuate the smallest frequency excursion of 2.5 GHz by ~8-10 dB. At the same time, the OSR 14 preferably has a bandwidth high enough to pass a 10 Gb/s return-to-zero (RZ) pulse stream, which requires >10 GHz bandwidth. A multi-cavity filter can allow an increase in slope without decreasing bandwidth, however, a higher slope generally implies a smaller bandwidth, so that there may be design limitations to consider for the OSR 14 for 10 Gb/s. The OSR 14 for a 25 Gb/s system using the above scheme, preferably has a slope ~10 dB/6 GHz or ~1.6 dB/GHz and a bandwidth that allows >25 GHz bandwidth, which is easier to achieve using multi-cavity filters.

The various methods of DPSK generation above can be chosen depending on technology of the FM source and restrictions on the OSR design based on the selected filter technology. Candidate FM sources 12 include directly modulated distributed feedback laser (DFB), a directly gain modulated distributed Bragg reflector laser (DBR), vertical cavity surface emitting lasers (VCSELs) as well as the family of intra-cavity phase modulated (ICPM) lasers. The ICPM family of lasers includes any laser which includes a phase modulator section in its laser cavity that can be modulated at high speed. These include DBR lasers, sampled grating DBR lasers, modulated grating Y branch (MGY) lasers, external cavity lasers, and coupled cavity lasers with modulated phase section. The advantage of a phase modulated laser is that they may generate frequency modulation without any significant amplitude modulation, which relaxes the requirement on the OSR design. The FM source 12 may, for example, include the lasers disclosed in U.S. patent application Ser. No. 12/115,337 filed May 5, 2008.

The OSR 14 may include a multi-cavity etalon filter, a single or multi-cavity ring resonator filter, an arrayed waveguide grating (AWG) filter, and fiber Bragg grating filter.

Figure 10:
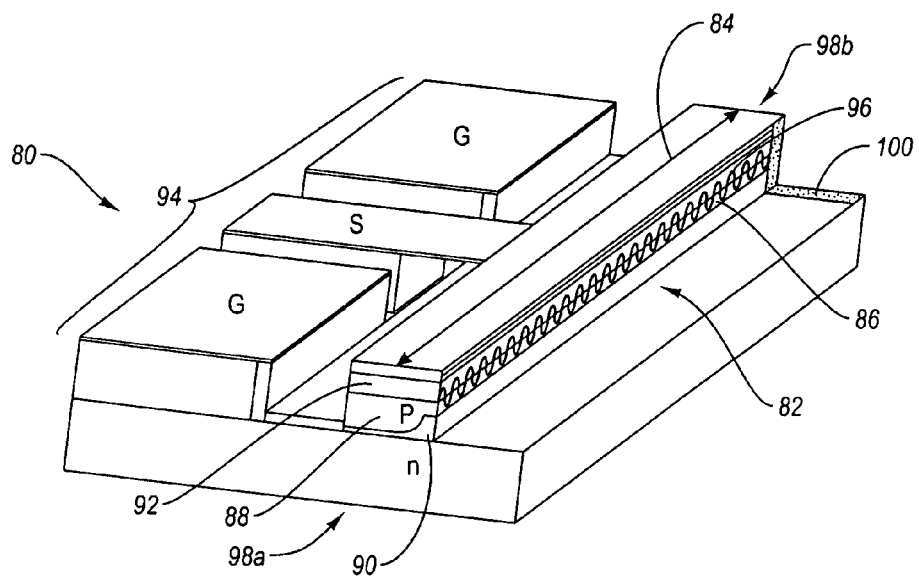
FIG. 10 is an isometric view of a laser suitable for generating DNPSK signals in accordance with embodiments of the present invention.

Referring to FIG. 10, an FM source 12 may be embodied as the illustrated semiconductor laser 80. The laser 80 may be embodied as a buried hetero-structure laser having a distributed feedback (DFB) cavity 82 of length 84. The length 84 is preferably very short. For example, the length 84 may be less than 100 μm long. The cavity 82 may include a gain medium 86 comprising a number of multi-quantum wells (MQW). In a preferred embodiment the gain medium 86 includes twenty or more MQWs. The MQWs may be strain compensated.

Figure 11:
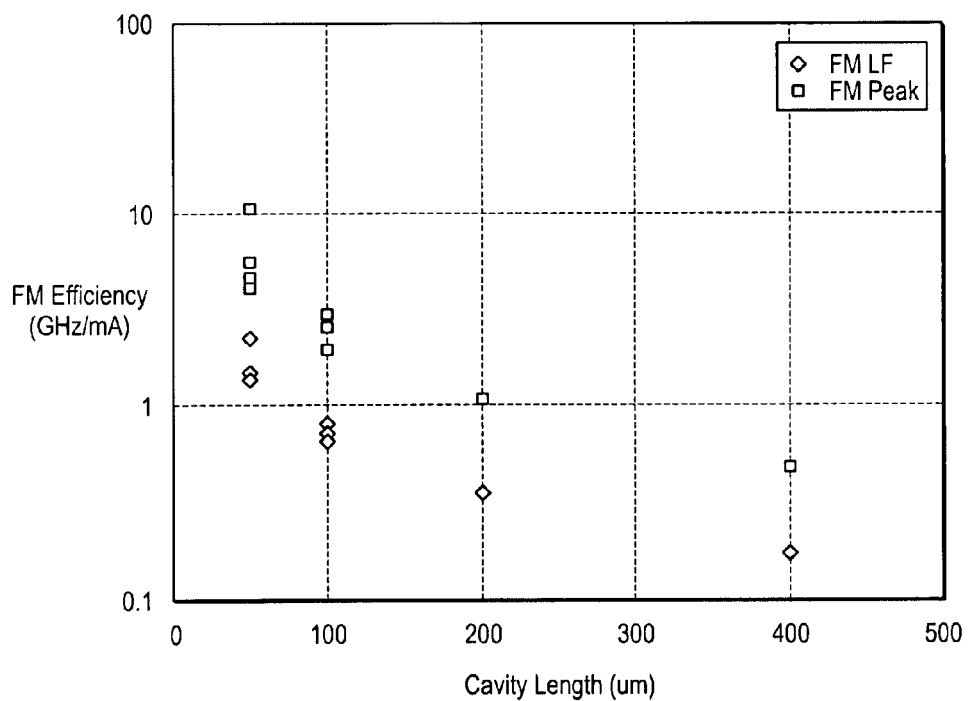
FIG. 11 is a plot illustrating the frequency modulation efficiencies of lasers with respect to cavity length.
Figure 12:
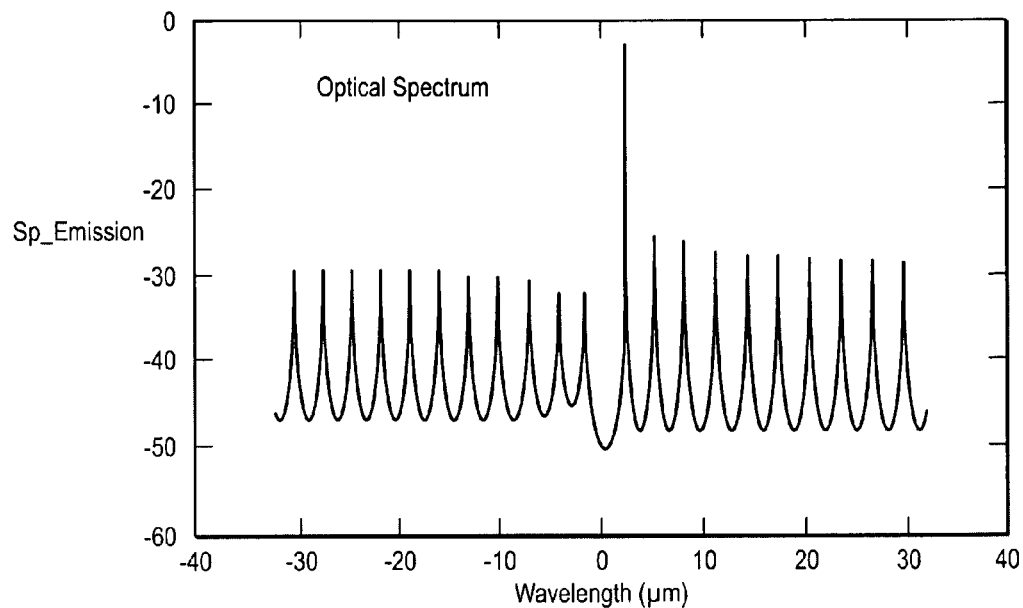
FIG. 12 illustrates the optical spectrum of the laser of FIG. 10.

FIG. 11 plots simulations of the FM efficiency of a DFB laser as a function of cavity length 84. As is apparent, FM efficiency increases with decreasing cavity length 84. In some embodiments, both the adiabatic chirp at low modulation frequency (LF) and peak FM efficiency increased as length decreased. According to the illustrated simulation results an FM efficiency target of 1.5 GHz/mA appears to be feasible for a cavity length of 100 μm. Referring to FIG. 12, the optical spectrum of the illustrated laser 80 is as illustrated. As is apparent in the figure, the laser 80 has a side-mode-suppression ratio (SMSR) greater than 30 dB.

In embodiments in which the laser 80 is modulated using an RZ modulation signal to generate a frequency modulated signal. In some embodiments, both adiabatic and transient chirp component contribute significantly to shift the phase of the carrier to generate the desired phase shift for the RZ-DQPSK, or DNPSK, coding schemes described hereinabove. The ratio of transient and adiabatic chirp may be selected according to a simulation to improve FM efficiency. In some embodiments, this includes supplying a bias current to the laser 80 that is less than five times the threshold current of the laser.

Transient and adiabatic chirp may be controlled by adjusting both laser bias and modulation current. In some embodiments, the laser 80 is driven by a substantially DC bias signal and a modulation signal encoding data. The DC bias and modulation signal may have a values effective to cause the transient chirp in the phase modulated portions 36 to be between about 15 and 50 percent of the adiabatic chirp relative to the frequency of the fixed phase portions 38, preferably between 25 and 40 percent.

A large number of MQWs facilitates high speed operation of the laser 80 notwithstanding the short cavity length 84. The resonant frequency of the laser has been shown to increase by a factor of 2 as the number of quantum wells are increased from 10 to 20 and as the cavity length is reduced from 350 μm to 120 μm. In a preferred embodiment, the MQWs of the gain medium 86 include strain compensated InGaAlAs/InGaAsP. The use of Al in the barriers of the MQWs facilitates the use of a large number of quantum wells while reducing hole pile up, which tends to cause non-uniform current injection and degrade high speed performance. The relaxation oscillation frequency has been shown to degrade when the number of quantum wells was increased to more than 10 when InGaAsP barriers are used. Experiments conducted by the inventors have shown that at an output power of 10 mW, a FP laser having a cavity length of 120 μm and 20 quantum wells has a relaxation oscillation frequency of ~25 GHz, which demonstrates the feasibility of a DFB laser having a cavity length less than 100 μm.

The gain medium 86 may be positioned laterally between blocking layers 88. The gain medium 86 and blocking layers 88 are positioned above a first electrode 90, such as an n-type electrode, and below a second electrode 92, such as a p-type electrode. High speed frequency modulation of the laser 80 may be facilitated by reducing parasitic capacitance while maintaining low thermal impedance. Accordingly, the blocking layers 88 may be doped with carbon or iron to reduce their capacitance. The first electrode 90 may receive a modulation signal through the signal electrode of a ground-signal-ground electrode structure 94 to reduce wire bond lengths, which tends to reduce parasitic inductance for higher modulation bandwidth.

The gain medium 86 may be coupled to a distributed feedback grating 96. The grating 96 may be configured to compensate for the relatively short cavity length of the laser 80. Because the laser cavity is relatively short, its effective loss is higher. In order to ensure low threshold carrier density and high differential gain for high-speed operation, the cavity loss for short cavity laser is preferably reduced. The shorter round trip of photons within the laser cavity implies more frequent incidences of photons on reflectors defining the laser cavity. This increases the risk of multi-mode operation and requires a higher effective grating reflectivity, κL. This implies a higher required grating coupling coefficient κ, because of the shorter length L (length 84).

Figure 13:
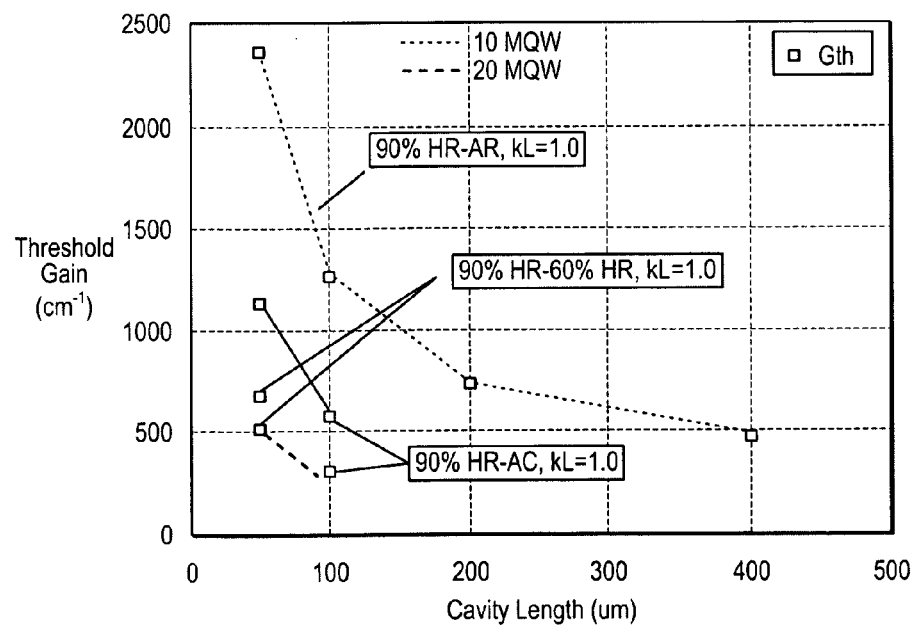
FIG. 13 is a plot illustrating threshold gain as a function of cavity length for lasers having antireflective coatings of varying reflectivity.

To reduce losses from the laser cavity, one or both of the output facet 98a and opposing facet 98b of the laser 80 may bear a highly reflective coating 100. In some embodiments, the opposing facet bears a coating 100 that reflects 90 percent, or more, of incident light. The highly reflective coatings 100 may tend to force the Fabry-Perot modes to dominate over the DFB modes, and are preferably balanced. For example, the grating reflectivity κL and the reflectivity of the coatings 100 may be chosen in order to achieve single mode operation. FIG. 13 shows threshold gain as a function of cavity length with various facet coatings for 10 MQW and 20 MQW lasers. In each case, the opposing facet 98b is coated to achieve approximately 90% reflectivity. In order to maintain the typical threshold gain of 500 cm$^{-1}$, which is the case for standard cavity length of 400 μm, the output facet 98a preferably has 30% reflectivity for a laser with 100 μm cavity length and 60% for shorter cavity lengths.

As the cavity length 84 is reduced the grating coupling coefficient κ is preferably increased. For example, for a laser 80 having a cavity length 84 of 50 μm, the corresponding grating coupling coefficient is preferably $\kappa=100\ cm^{-1}$ such that κL is ~1. For such high values of κ, the grating 96 preferably has a depth of ~30 nm, which may be accomplished using a combination of dry etching and wet etching together with an InP etch stop layer, as known in the art.

Figure 14:
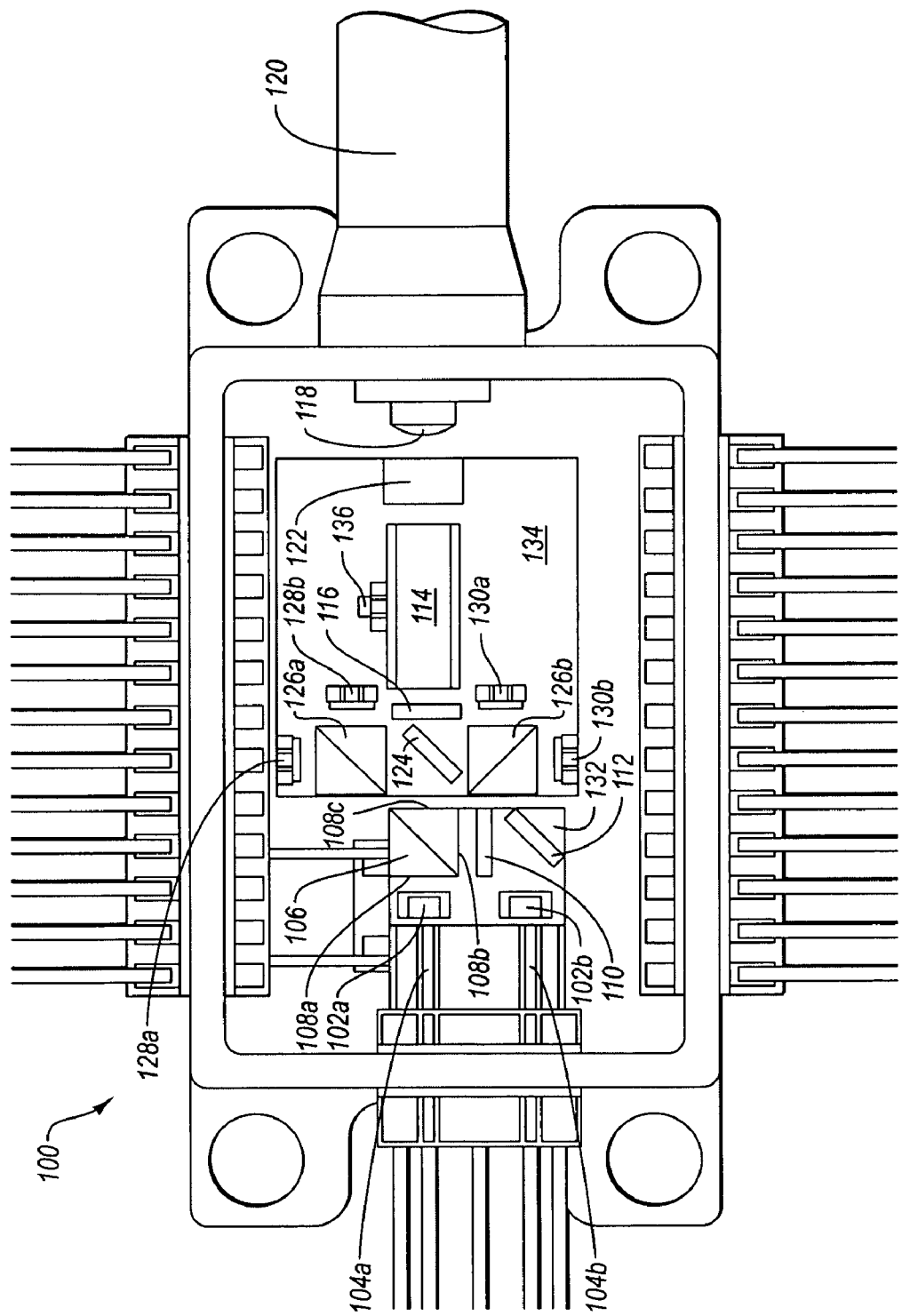
FIG. 14 is a top view of a transmitter having two FM sources and a polarization multiplexer in accordance with an embodiment of the present invention.

Referring to FIG. 14, a transmitter 100 may include first and second FM sources 12, each modulated according to one of the DPSK, DQPSK, or DNPSK, modulation schemes described hereinabove to generate an output having phase modulated portions 36 and fixed phase portions 38. In the illustrated embodiment, the FM sources 12 are embodied as lasers 102a, 102b. The lasers 102a, 102b may be embodied as lasers that inherently produce polarized light, however non-polarized light sources may also be used. The lasers 102a, 102b may be embodied as the laser 80 of FIG. 10, or as the lasers described in U.S. patent application Ser. No. 12/115, 337 filed May 5, 2008.

The lasers 102a, 102b may also be embodied as other lasers known in the art that have high FM efficiency. Each laser 102a, 102b is coupled to one or more input signal lines 104a, 104b, respectively, for providing one or both of a modulating signal encoding digital data and a bias signal. The signal lines 104a, 104b may also couple thermal tuning signals to stripe heaters coupled to the lasers 102a, 102b.

The lasers 102a, 102b emit light into orthogonal facets of a polarizing beam splitter (PBS) 106. The PBS 106 has input facets 108a, 108b. Light incident on input facet 108a having a first polarization will be coupled to an output facet 108c with low loss relative to other polarizations. Light incident on facet 108b having a second polarization orthogonal to the first polarization will be coupled to the output facet 108c with low loss relative to other polarizations, including the first polarization. The polarizations of light incident on the PBS 106 from the lasers 102a, 102b are preferably oriented such that they are coupled to the output facet of the PBS 106 with low loss. Where low- or non-polarized lasers 102a, 102b are used, the polarizations that do not correspond to the preferred polarization of the input facet 108a, 108b, respectively, will be attenuated in the output of the PBS 106, such that a polarization multiplexed beam will be generated notwithstanding the lack of polarization of the laser outputs.

In some embodiments, light from the laser 102b passes through a half-wave plate 110 prior to entering the PBS 106. The half-wave plate 110 has its extraordinary axis positioned such that it rotates the polarization of light from laser 102b by ninety degrees. For example, the half-wave wave plate 110 may have its extraordinary axis rotated forty-five degrees relative to the predominant linear polarization of the laser 102b. In an alternative embodiment, the laser 102b is oriented such that light emitted therefrom has a polarization that is rotated ninety degrees relative to that of light emitted from the laser 102a.

In some embodiments, the lasers 102a, 102b are formed on the same chip parallel to one another such that light from laser 102a is incident on input facet 108a of the PBS 106. In such embodiments, a turning mirror 112 may be used to redirect light from the laser 102b ninety degrees such that it is normal to input facet 108b of PBS 106 that is orthogonal to input facet 108a.

Light output from the output facet 108c of the PBS 106 is transmitted through an optical spectrum reshaper (OSR) 114, which attenuates the phase modulated portions 36 of the outputs of the lasers 102a, 102b as described hereinabove. In some embodiments, a quarter-wave plate 116 may be positioned between the PBS 106 and the OSR 114 to reduce back reflection to the lasers 102a, 102b. The quarter-wave plate 116 preferably has its extraordinary axis rotated forty-five degrees relative to the preferred polarizations of input facets 108a, 108b of the PBS 106. The quarter-wave plate 116 may be configured as disclosed in U.S. Pat. No. 6,842,467, which is incorporated herein by reference. In a preferred embodiment, the quarter-wave plate 116 imparts a circular polarization on input light. Circularly polarized light that is reflected back through the quarter-wave plate will be circularly polarized having an opposite handedness as a consequence of the reflection. Upon being transmitted back through the quarter-wave plate 116 the reflected light will have a linear polarization that is orthogonal that of the original beam. Inasmuch as the gain of some lasers is polarization dependent, the orthogonal polarization of the back reflected light reduces its effect on the output of the laser 102a, 102b.

The output of the OSR 114 is transmitted through a focusing lens 118 and coupled to coupling optics, such as a fiber pigtail 120, which couples the light to an output fiber. A polarization independent optical isolator 122 may be positioned between the lens 118 and the OSR 114 to reduce back reflection from the lens 118.

In some embodiments, the transmitter 100 may include means for monitoring and controlling its performance. In the illustrated embodiment, a tap splitter 124 is positioned between the PBS 106 and the OSR 114. A fraction of light transmitted from the PBS 106 to the OSR 114 is directed by the tap splitter 124 toward a PBS 126a. A fraction of light reflected from the OSR 114 back toward the PBS 106 is directed by the tap splitter 124 toward a PBS 126b. The fraction of light diverted by the tap splitter 124 may be less than ten percent, preferably about five percent.

The PBS 126a splits incident light into two output beams having orthogonal polarizations, each corresponding to the output of one of the lasers 102a, 102b. Each output beam is incident on one of two photodiodes 128a, 128b. The outputs of the photodiodes 128a, 128b are monitored to determine the output intensity of the lasers 102a, 102b. The PBS 126b likewise splits incident light into two output beams having orthogonal polarizations, each corresponding to the output of one of the lasers 102a, 102b. Each output beam is incident on one of two photodiodes 130a, 130b. The outputs of the photodiodes 130a, 130b are monitored to determine the amount of light rejected by the OSR 114. The ratio of the outputs of the photodiodes 128a and 130a and the ratio of the output of the photodiodes 128b and 130b may be monitored by a controller in order to control the wavelength of the lasers 102a and 102b, respectively. The ratios correspond to the amount of light transmitted through the OSR 114, which depends on the wavelength of the lasers 102a, 102b. The wavelength of the lasers 102a, 102b may therefore be adjusted such that the ratios are maintained at a predetermined level.

In some embodiments, the lasers 102a, 102b, PBS 106, and half-wave plate 110 are mounted on a thermoelectric cooler (TEC) 132. The OSR 114 may be mounted on a second TEC 134. In some embodiments, a thermistor 136, or other temperature sensor, is mounted to the OSR 114 for providing feedback regarding its temperature. In some embodiments the polarizing beam splitters 126a, 126b and the photodiodes 128a, 128b, 130a, 130b are also mounted on the TEC 134. The temperature of the thermoelectric coolers 132, 134 may be controlled to maintain the optical properties of the components mounted thereon at proper levels.

Figure 15:
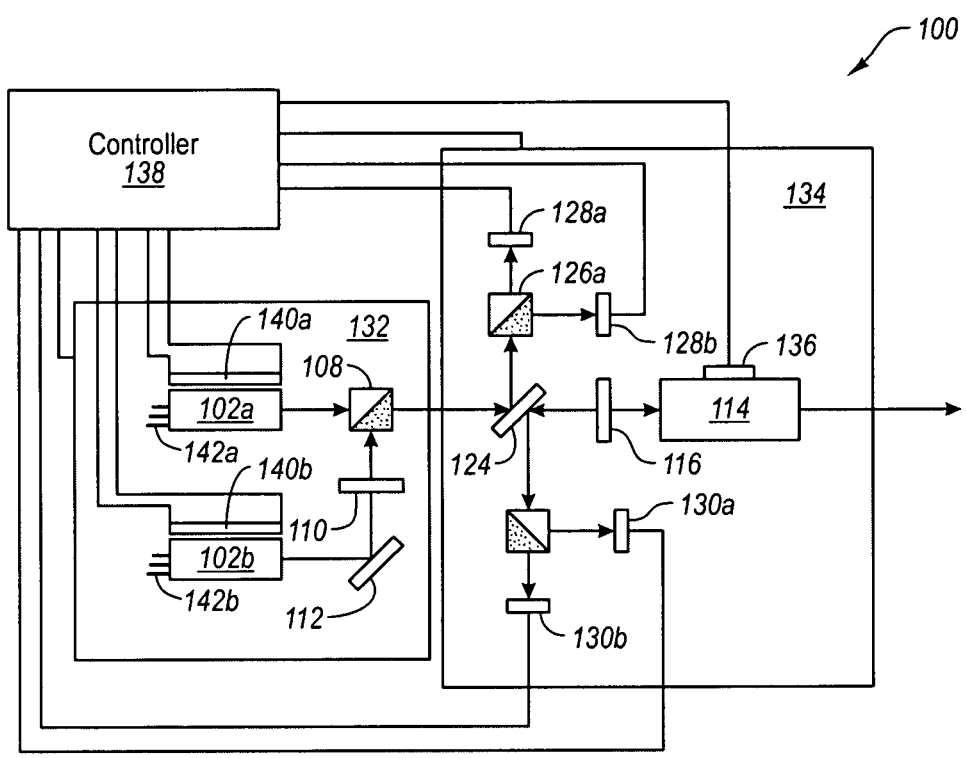
FIG. 15 is a schematic illustration of the laser of FIG. 14.

FIG. 15 schematically illustrates an embodiment of the transmitter 100. A controller 138 receives inputs from the photodiodes 128a, 128b, 130a, 130b and from the thermistor 136. In some embodiments, stripe heaters 140a, 140b are in thermal contact with the lasers 102a, 102b. The controller 138 may control power supplied to the stripe heaters 140a, 140b according to the outputs of the photodiodes 128a, 128b, 130a, 130b in order to maintain the wavelengths of the lasers 102a, 102b in proper relation to the transmission function of the OSR 114. In some embodiments, the controller 138 controls bias current supplied to at least a portion of the gain section of the lasers 102a, 102b according to the outputs of the photodiodes 128a, 128b, 130a, 130b in order to maintain the wavelengths and/or intensities of the lasers 102a, 102b in proper relation to the transmission function of the OSR 114. In some embodiments, the controller 138 adds a bias current to a modulation signal imposed on input traces 142a, 142b of the lasers 102a, 102b according to the outputs of the photodiodes 128a, 128b, 130a, 130b in order to maintain the wavelengths of the lasers 102a, 102b in proper relation to the transmission function of the OSR 114

The controller 138 may also receive an output of the thermistor 136 and supply power to the TEC 134 in order to maintain the OSR 114 at a substantially constant preset temperature. The controller 138 may likewise control power supplied to TEC 132.

Figure 16:
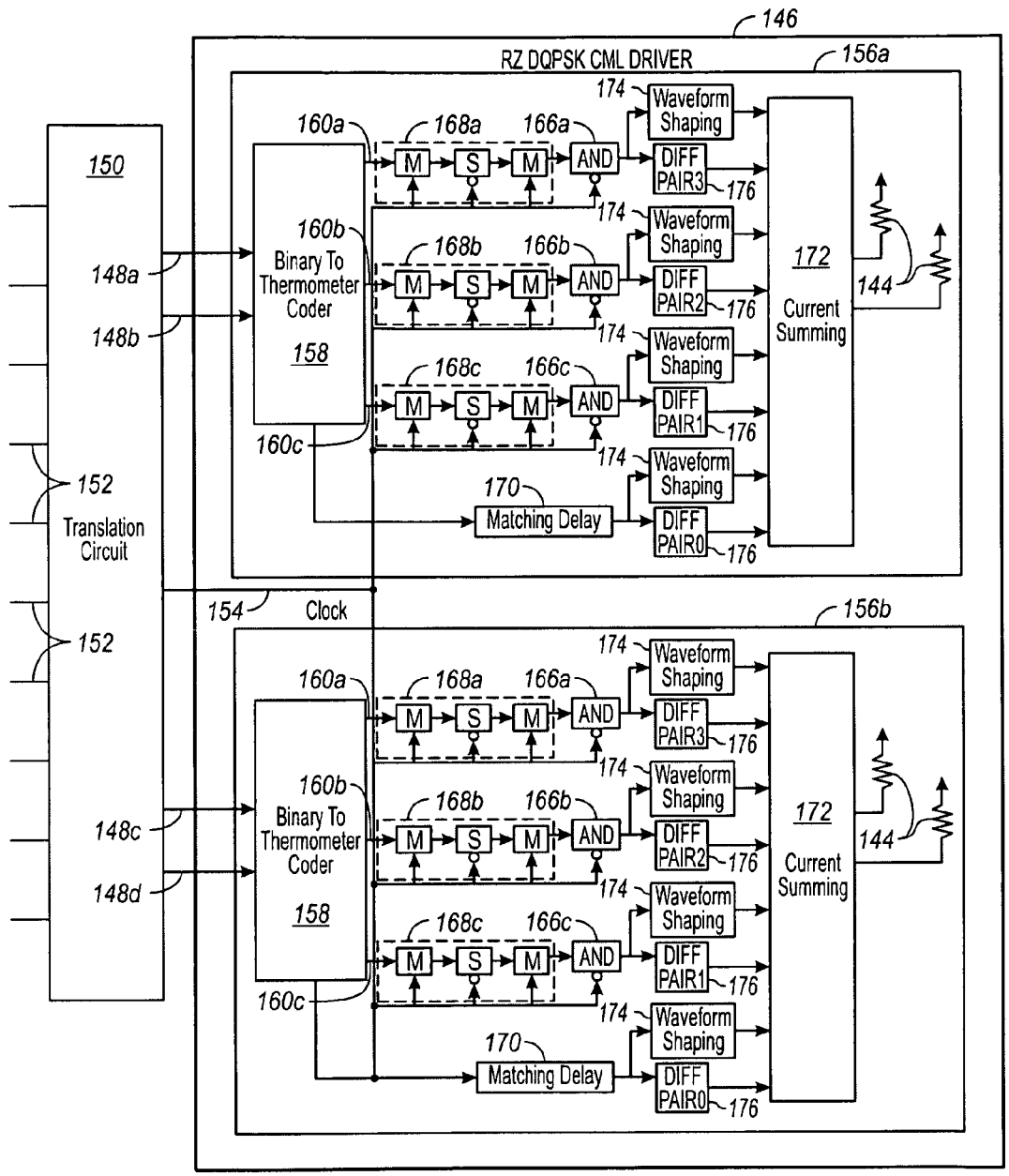
FIG. 16 is a schematic illustration of a driving circuit for use with a laser transmitter in accordance with an embodiment of the present invention.

Referring to FIG. 16, in some embodiments, the input lines 142a, 142b of the lasers 102a, 102b are coupled to output lines 144 of a driving circuit 146. The driving circuit 146 may also be used for driving other lasers having FM efficiency, whether singly or in an array of two or more. The driving circuit 146 receives four outputs 148a-148d from a translation circuit 150 that that has inputs 152 each receiving binary data signals. The translation circuit 150 translates data on its inputs 152 to data signals coupled to outputs 148a-148d. In some embodiments, the number of inputs 152 exceeds the number of outputs 148a-148d of the driving circuit 146. For example, in the illustrated embodiment, 10 inputs 152 each receive a data signal at a rate of 10 Gb/s. The input data signals are translated into four 25 Gb/s data signals transmitted to the outputs 148a-148d of the driving circuit 146. The translation circuit 150 may also include a clock signal line 154 that outputs a clock signal having a clock period equal to a bit rate of data on the outputs 148a-148d. The clock signal may also be synchronized with data symbols transmitted on the outputs 148a-148d. The clock signal line 154 may include circuits providing an adjustable delay and duty factor in order to achieve a pulse width and timing for improving the performance of the driving circuit 146.

The driving circuit 146 includes two DQPSK, or DNPSK, encoding modules 156a, 156b. Each encoding module 156a, 156b receives a pair of the outputs 148a-148d. In embodiments having a DNPSK modulating scheme, each encoding module 156a, 156b would receive N outputs of the translation circuit 150. The pairs of outputs 148-148d are received by a binary-to-thermometer coder 158. Each binary-to-thermometer coder 158 has three output lines 160a-160c. In embodiments for use with a DNPSK modulating scheme, the binary-to-thermometer coder 158 may receive N inputs and have $2^N-1$ output lines 160. In some embodiments, the binary-to-thermometer coder 158 is embodied as an N-bit digital-to-analog converter.

Figure 17:
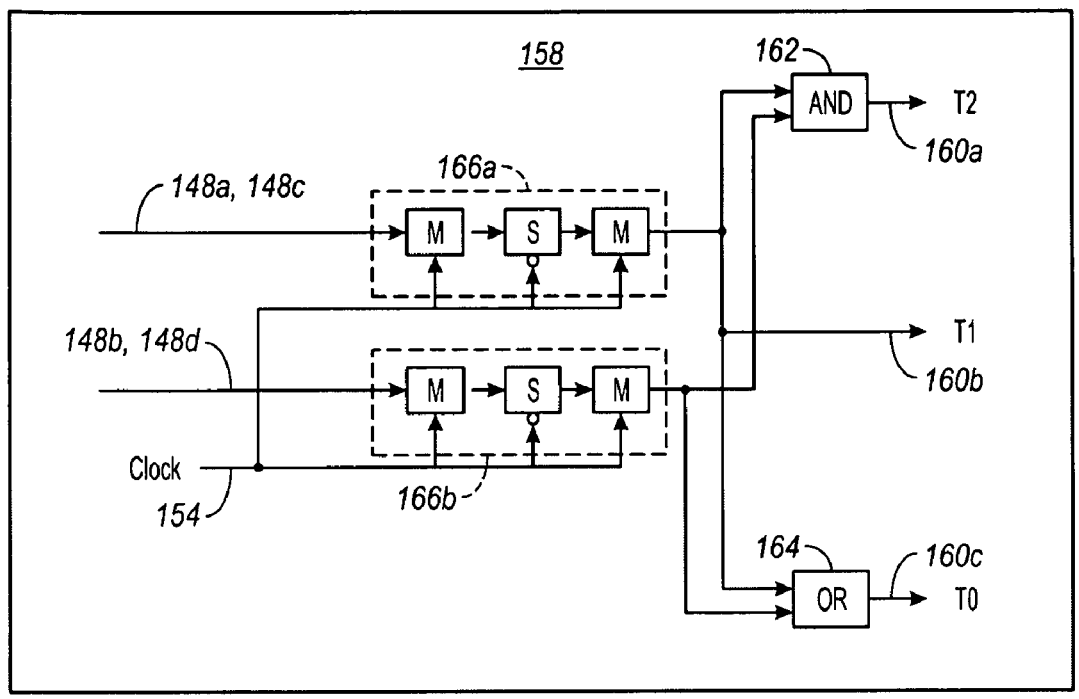
FIG. 17 is a schematic illustration of a binary-to-thermometer coder for use with a driving circuit in accordance with an embodiment of the present invention.

Referring to FIG. 17, the binary-to-thermometer coder 158 outputs signals on its outputs 160a-160c such that the number of outputs 160a-160c outputting logical 1s corresponds, or is equal to, the value of a two (or N) bit word with each bit in the two (or N) bit word corresponding to one of the two (or N) symbols that are received simultaneously from the outputs 148a and 148b or 148c and 148d. For example, where output 148a outputs a logical 1 and output 148b simultaneously outputs a logical 1, the binary-to-thermometer coder 158 will output logical 1s on three of its outputs 160, corresponding to the value of b11, which is three in the base ten numbering system. Of course, the number of signal lines output a logical 1 for each possible combination of data symbols may be arbitrarily assigned, with the only requirement being that each unique combination of symbols be translated to a unique number of signal lines outputting logical 1s or 0s.

In the illustrated two bit embodiment, output 148a is coupled to an output line 160b. Outputs 148a and 148b are coupled to an AND gate 162 having its output coupled to an output line 160c. Output lines 148a and 148b are coupled to the inputs of an OR gate 164 having its output coupled to an output line 160a. In the illustrated embodiment, the input lines 148a, 148b are coupled to the outputs 160a-160c through MSM flip-flops 166a, 166b, respectively. The MSM flip-flops 166a, 166b latch signals in response to the clock signal from the clock signal line 154.

Referring again to FIG. 16, the outputs 160a-160c of the binary-to-thermometer coder are input to AND gates 166a-166c. The AND gates 166a-166c are also coupled to the clock signal line 154. In the illustrated embodiment, the clock signal is inverted prior to input to the AND gates 166a-166c. The AND gates 166a-166c convert signals on the outputs 160a-160c from non-return-to-zero (NRZ) signals to return-to-zero (RZ) signals such that each signal returns to the same reference level between each data symbol. The output of the AND gates 166a-166c will be a logical 0 whenever the clock signal is a logical 1. In the illustrated embodiment, the outputs 160a-160c are coupled to the AND gates 166a-166c by means of MSM flip-flops 168a-168c that have the clock signal line 154 coupled to their clock inputs. The MSM flip-flops 168a-168c may facilitate data alignment and provide good phase margin of the signals input to the AND gates 166a-166c.

A matching delay circuit 170 is coupled to the clock signal line 154 and produces at its output a delayed version of the clock signal. The output of the matching delay circuit 170 is preferably delayed such that rising edges of the delayed version of the clock signal substantially coincide with rising edges of logical 1s in the outputs of the AND gates 166a-166c. In embodiments where one of the data symbols may have a frequency equal to the carrier frequency of the fixed phase portions 38, such as are described hereinabove with respect to FIGS. 5 through 7, the matching delay circuit 170 may be omitted and only the outputs of the AND gates 166a-166c used to produce a modulation signal The outputs of the AND gates 166a-166c and the matching delay circuit 170 are then input to a current summer 172, which produces an output corresponding to the sum of the input signals. The outputs of the AND gates 166a-166c and the matching delay circuit 170 may be input to the current summer 172 through one or both of a waveform shaper 174 and a differential pair 176. The differential pairs 176 preferably have matching tail currents. The waveform shaper 174 may perform such functions as pre-emphasis, cross-point adjustment, amplitude variation, jitter pre-compensation, rise and fall time adjustment, and the like.

The current summer 172 produces one or more outputs 144. The outputs 144 may have an impedance matching that of the laser receiving the output current. In the illustrated embodiment, the output impendence is 50 Ohms. The output of the current summer 172 may be combined with a bias signal to drive a laser, such as the laser 80 described hereinabove, or some other laser having high FM efficiency. In some embodiments, the current output by the summer 172 has a sign opposite that of the bias signal or is combined with the bias in a manner such that the current injected into the laser is reduced by the magnitude of the output of the summer 172. In some embodiments, the bias is applies to a gain section of the laser whereas the output of the summer 172 is injected into an electro-absorption modulation section, in which case the output of the summer may have the same or different sign as the bias current. This modulation technique may be performed using a laser such as is described in U.S. patent application Ser. No. 12/115,337 filed May 5, 2007.

In other embodiments, the output of the summer 172 may have a direction either the same or opposite that of the bias current such that the output of the laser will include frequency excursions on either side of the carrier frequency, such as in the modulation scheme described hereinabove with respect to FIGS. 6 through 9.

Figure 18:
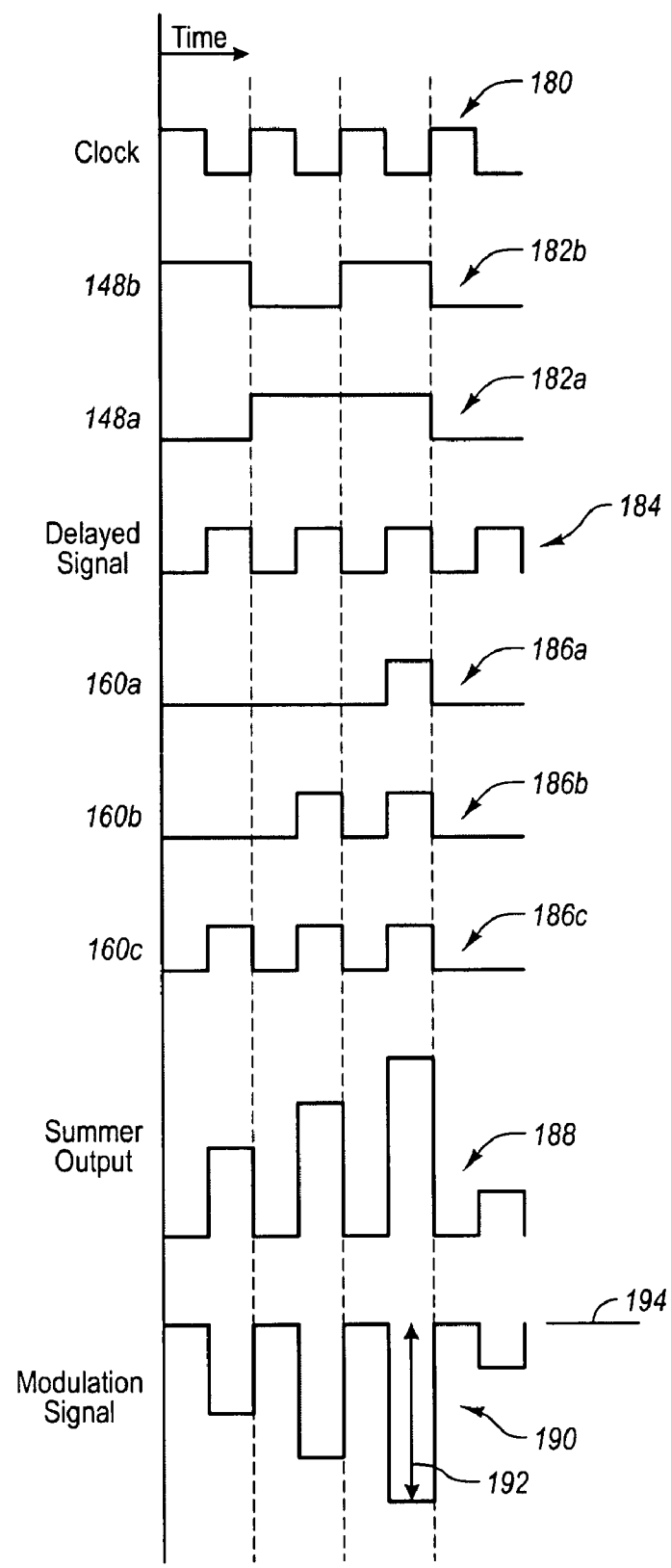
FIG. 18 is a timing diagram illustrating signal with a driving circuit in accordance with an embodiment of the present invention.

FIG. 18 illustrates the timing of signals within the driving circuit 146 for some embodiments. In the illustrated example, the clock signal line 154 carries a clock signal 180 having alternating high and low levels and corresponding rising and falling edges. The outputs 148a, 148b (or 148c, 148d) include digital data signals 182a, 182b including logical 1s and 0s. In the illustrated example, signal 182a includes the data signal b0110 and the signal 182b includes the signal b1010.

The matching delay circuit 170 produces a delayed clock signal 184 having rising edges thereof coincident with rising edges in outputs 186a-186c of the AND gates 166a-166c. The summed signals 184 and 186a-186c are summed by the summer 172 to produce signal 188. As is apparent in FIG. 17 each of the outputs 186a-186c includes rising edges to represent logical 1s. In some embodiments, one or more of the outputs 186a-186c may be inverted following the AND gates 166a-166c to generate a summed signal 188 that includes excursions both above and below the signal level between bits. Such a signal may be used in the modulation schemes described hereinabove with respect to FIGS. 6 through 9.

The summed signal 188 may then be combined with a bias signal to generate a modulation signal 190 including excursions 192 above or below a signal level 194, with the excursions 192 corresponding to frequency excursions above or below a carrier frequency in the output of the laser driven with the modulation signal 190 according to the modulation schemes described hereinabove. Frequencies above or below the carrier frequency are relatively more attenuated than the carrier frequency by the OSR, such as an OSR 14, 114, as described hereinabove.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for communicating data comprising:
generating N data streams comprising data symbols;
for each of a plurality of sets of N simultaneous data symbols of the N data streams, imposing signals on L of a plurality of signal lines, the value of L corresponding to values of the N simultaneous data symbols;
coupling each of the plurality of signal lines to master-slave-master flip-flops each receiving a clock signal synchronized with the N data streams;
ANDing signals on the plurality of signal lines with the clock signal to produce RZ signals;
summing the RZ signals to generate a summed signal; and
inputting the summed signal to a laser, the laser producing an output having frequency modulation corresponding to a magnitude of the summed signal.

2. The method of claim 1, wherein ANDing the plurality of signal lines with the clock signal comprises ANDing outputs of the master-slave-master flip flops with an inverted form of the clock signal.

3. The method of claim 2, wherein summing the RZ signals further comprises summing the RZ signals with each other and a delayed version of the clock signal.

4. The method of claim 3, wherein rising edges of the delayed version of the clock signal are substantially simultaneous with rising edges of the RZ signals.

5. The method of claim 3, wherein the delayed version of the clock signal is delayed relative to the clock signal by an amount corresponding to a delay introduced by the master-slave-master flip-flops and an AND gate.

6. The method of claim 1, wherein summing the RZ signals further comprises summing the RZ signals with each other and a delayed version of the clock signal.

7. The method of claim 1, wherein inputting the summed signal to the laser comprises combining the summed signal with a bias signal current prior to inputting the combined signal to the laser.

8. The method of claim 7, wherein the summed signal includes current having a sign opposite that of the bias signal current.

9. The method of claim 1, further comprising:
outputting from the laser a series of pulse pairs each pulse pair having a phase modulated portion followed by a fixed phase portion, the phase modulated portion having a frequency shift relative to a carrier frequency, the frequency shift encoding at least one data symbol, and the fixed phase portion having a phase difference relative to a preceding pulse pair corresponding to the frequency shift of the phase modulated portion, the fixed phase portions of the signal having a frequency substantially equal to one another and to the carrier frequency;
attenuating the output of the laser such that a plurality of the phase modulated portions are substantially more attenuated than the fixed phase portions; and
transmitting the attenuated output to a receiver.

10. The method of claim 9, wherein attenuating the output of the laser comprises passing the output of the laser through an optical filter.

11. The method of claim 9, wherein the frequency shift of the phase modulated portion is equal to one of N frequency shifts each encoding a unique value of a $\log_2 N$ bit data word.

12. An apparatus for supplying a modulation signal to a laser, the apparatus comprising:
a digital signal source;
a binary-to-thermometer coder coupled to the digital signal source and configured to output signals on L of $2^N-1$ signal lines with the value of L corresponding to one or more data symbols received from the digital signal source;
a summing circuit coupled to the signal lines of the binary-to-thermometer coder configured to produce an output current corresponding to a sum of output signals on the signal lines of the binary-to-thermometer coder;
a laser coupled to the summing circuit and configured to generate a frequency modulated signal according to the output current;
a clock signal source configured to output a clock signal synchronous with data symbols output from the digital signal source;

a plurality of AND gates each coupled to one of the $2^N-1$ signal lines and the clock signal source, the summing circuit coupled to outputs of the plurality of AND gates; and an optical filter, the optical filter having a transmission function such that frequencies in the frequency modulated signal generated when the outputs of one or more of the AND gates are at a logical 1 are attenuated to a greater extent than frequencies in the frequency modulated signal generated when the outputs of the AND gates are at a logical 0.

13. The apparatus of claim 12, wherein the outputs of the plurality of AND gates are coupled to the summing circuit by means of at least one of a differential pair and a waveform shaping circuit.

14. The apparatus of claim 13, wherein the waveform shaping circuit is configured to perform at least one of pre-emphasis, cross-point adjustment, amplitude variation, jitter pre-compensation, rise time adjustment, and fall time adjustment.

15. The apparatus of claim 12, wherein the clock signal source is coupled to the plurality of AND gates by means of at least one NOT gate.

16. The apparatus of claim 12, wherein the binary-to-thermometer coder is configured to receive N inputs and to output signals on L of the plurality of signal lines according to values of simultaneously received data symbols received at the N inputs.

17. The apparatus of claim 12, further comprising a delay circuit configured to receive the clock signal from the clock signal source and generate a delayed version of the clock signal, the summer being coupled to the delay circuit and configured to produce an output current corresponding to a sum of an output of the delay circuit with the outputs of the signal lines of the binary-to-thermometer coder.

18. An apparatus for supplying a modulation signal to a laser, the apparatus comprising:

a digital signal source;

a binary-to-thermometer coder coupled to the digital signal source and configured to output signals on L of $2^N-1$ signal lines with the value of L corresponding to one or more data symbols received from the digital signal source;

a summing circuit coupled to the signal lines of the binary-to-thermometer coder configured to produce an output current corresponding to a sum of output signals on the signal lines of the binary-to-thermometer coder;

a laser coupled to the summing circuit and configured to generate a frequency modulated signal according to the output current;

a clock signal source configured to output a clock signal synchronous with data symbols output from the digital signal source; and a plurality of AND gates each coupled to one of the $2^N-1$ signal lines and the clock signal source, the summing circuit coupled to outputs of the plurality of AND gates, wherein the plurality of AND gates are each coupled to one of the $2^N-1$ signal lines by means of a master-slave-master flip-flop.

19. The apparatus of claim 18, further comprising a delay circuit configured to receive the clock signal from the clock signal source and generate a delayed version of the clock signal, the summer being coupled to the delay circuit and configured to produce an output current corresponding to a sum of an output of the delay circuit with the outputs of the signal lines of the binary-to-thermometer coder; wherein the delay circuit is configured to cause the delayed version of the clock signal to be delayed relative to the clock signal by an amount corresponding to a delay introduced by the master-slave-master flip-flops and an AND gate.

20. The apparatus of claim 18, wherein the outputs of the plurality of AND gates are coupled to the summing circuit by means of at least one of a differential pair and a waveform shaping circuit.

21. The apparatus of claim 20, wherein the waveform shaping circuit is configured to perform at least one of pre-emphasis, cross-point adjustment, amplitude variation, jitter pre-compensation, rise time adjustment, and fall time adjustment.

22. The apparatus of claim 18, further comprising a delay circuit configured to receive the clock signal from the clock signal source and generate a delayed version of the clock signal, the summer being coupled to the delay circuit and configured to produce an output current corresponding to a sum of an output of the delay circuit with the outputs of the signal lines of the binary-to-thermometer coder.

* * * * *

UNITED STATES PATENT AND TRADEMARK OFFICE
CERTIFICATE OF CORRECTION

PATENT NO. : 8,204,386 B2  
APPLICATION NO. : 12/126717  
DATED : June 19, 2012  
INVENTOR(S) : Mahgerefteh et al.

Page 1 of 1

It is certified that error appears in the above-identified patent and that said Letters Patent is hereby corrected as shown below:

On the Title Page, in Field (74), under "Attorney, Agent, or Firm", in Column 2, Line 2, delete "Israelson" and insert -- Israelsen --, therefor.

Signed and Sealed this  
Nineteenth Day of February, 2013

Teresa Stanek Rea  
*Acting Director of the United States Patent and Trademark Office*